(12) United States Patent
Kumar et al.

(10) Patent No.: US 10,706,632 B2
(45) Date of Patent: Jul. 7, 2020

(54) METHOD AND APPARATUS FOR MANAGING A WIDE VIEW CONTENT IN A VIRTUAL REALITY ENVIRONMENT

(71) Applicant: Samsung Electronics Co., Ltd., Suwon-si, Gyeonggi-do (KR)

(72) Inventors: Santosh Kumar, Noida (IN); Ravinder Dhiman, Noida (IN); Prakash Chandra Chhipa, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/189,375

(22) Filed: Nov. 13, 2018

(65) Prior Publication Data
US 2019/0147657 A1 May 16, 2019

(30) Foreign Application Priority Data
Nov. 14, 2017 (IN) .............................. 201711040660

(51) Int. Cl.
*G06T 19/00* (2011.01)
*G06T 5/00* (2006.01)
*G06T 15/10* (2011.01)
*G02B 27/01* (2006.01)
*H04N 13/279* (2018.01)
*G06F 3/01* (2006.01)
(Continued)

(52) U.S. Cl.
CPC ........ *G06T 19/006* (2013.01); *G02B 27/0101* (2013.01); *G06F 3/011* (2013.01); *G06T 5/00* (2013.01); *G06T 15/10* (2013.01); *H04N 13/279* (2018.05)

(58) Field of Classification Search
None
See application file for complete search history.

(56) References Cited

U.S. PATENT DOCUMENTS 5,754,348 A * 5/1998 Soohoo ................. G06T 3/0018
359/436
7,301,648 B2 11/2007 Foxlin
(Continued)

FOREIGN PATENT DOCUMENTS

| CN | 106384330 A | 2/2017 |
|---|---|---|
| WO | 03-046632 A1 | 6/2003 |
| WO | 2015-102464 A1 | 7/2015 |

OTHER PUBLICATIONS

HashimotoLab, downloaded @ https://www.youtube.com/watch?v=hlMaVBFJ0ng, published on Jun 13, 2010 (Year: 2010).*
(Continued)

*Primary Examiner* — Yingchun He
(74) *Attorney, Agent, or Firm* — Jefferson IP Law, LLP

(57) ABSTRACT

A method for managing wide view content in a virtual reality (VR) environment and an apparatus therefor are provided. The method includes receiving content covering 360 degree or a wider viewing angle than a viewing angle of a user of the first device and displaying, on the VR device, a first view displaying at least one portion of the content covering the viewing angle of the user on a first view area of a display of the VR device, and a second view covering 360 degree or the wider viewing angle of the content using convex projection on a second view area of the display.

21 Claims, 20 Drawing Sheets

(51) Int. Cl.
  *H04N 21/485*   (2011.01)
  *H04N 21/431*   (2011.01)
  *H04N 21/4728*  (2011.01)
  *H04N 21/6587*  (2011.01)
  *G09G 5/14*     (2006.01)
  *G06F 3/0484*   (2013.01)
  *G06F 3/0481*   (2013.01)
  *G06T 3/00*     (2006.01)

(56) References Cited

U.S. PATENT DOCUMENTS

| | | | |
|---|---|---|---|
| 2009/0237564 | A1 | 9/2009 | Kikinis et al. |
| 2010/0002071 | A1 | 1/2010 | Ahiska |
| 2012/0277036 | A1 | 11/2012 | Lee |
| 2014/0267400 | A1 | 9/2014 | Mabbutt et al. |
| 2014/0285404 | A1 | 9/2014 | Takano |
| 2016/0148413 | A1* | 5/2016 | Oh .................. G06T 13/80 345/634 |
| 2016/0335801 | A1 | 11/2016 | Yoon et al. |
| 2017/0195615 | A1* | 7/2017 | Han .................. G06F 3/04883 |
| 2017/0280126 | A1* | 9/2017 | Van der Auwera ................ G06T 3/0062 |
| 2018/0075656 | A1* | 3/2018 | Kim .................. G06T 19/006 |

OTHER PUBLICATIONS

"Difference between Concave and Convex mirrors", https://topdifferences.com/difference-between-concave-and-convex-mirrors/, posted Aug. 24, 2017 (Year: 2017).*

PNF9010 SmartViewer Fisheye Dewarp—Wisenet P Series_https://www.youtube.com/watch?v=ziz3ZWNnzKE, Published on Jan. 9, 2017.

Sharing and Navigating 360 Videos and Maps in Sight Surfers_https://www.slideshare.net/A-juAn/sharing-and-navigating-360-videos-and-mapsin-sight-surfers-66695677, Published on Oct. 4, 2016.

YouTube now supports 360-degree videos_http://www.theverge.com/2015/3/13/8203173/youtube-now-supports-360-degreevideos, Mar. 13, 2015.

International Search Report dated Feb. 28, 2019; issued in International Application No. PCT/KR2018/013618.

European Search Report dated Feb. 27, 2020; European Application No. 18879292.3-1216 PCT/KR2018013618.

* cited by examiner

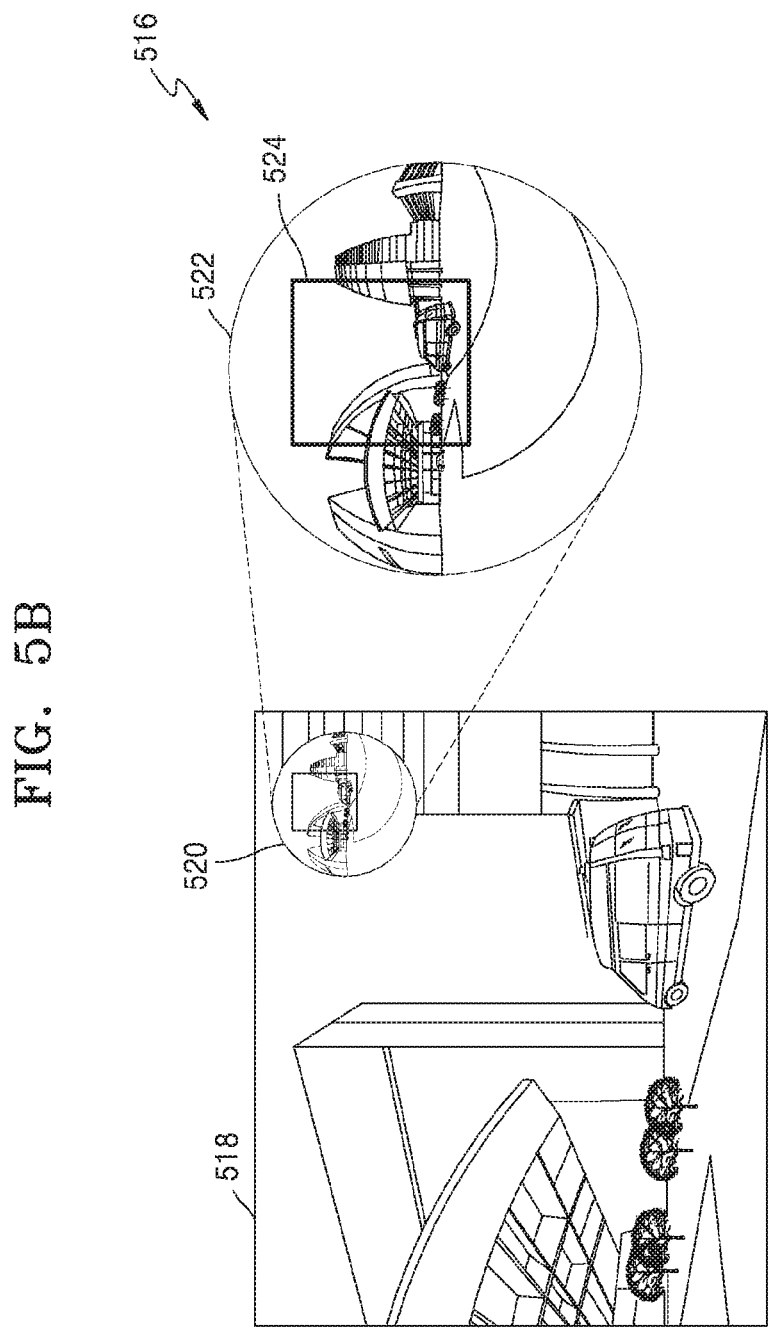

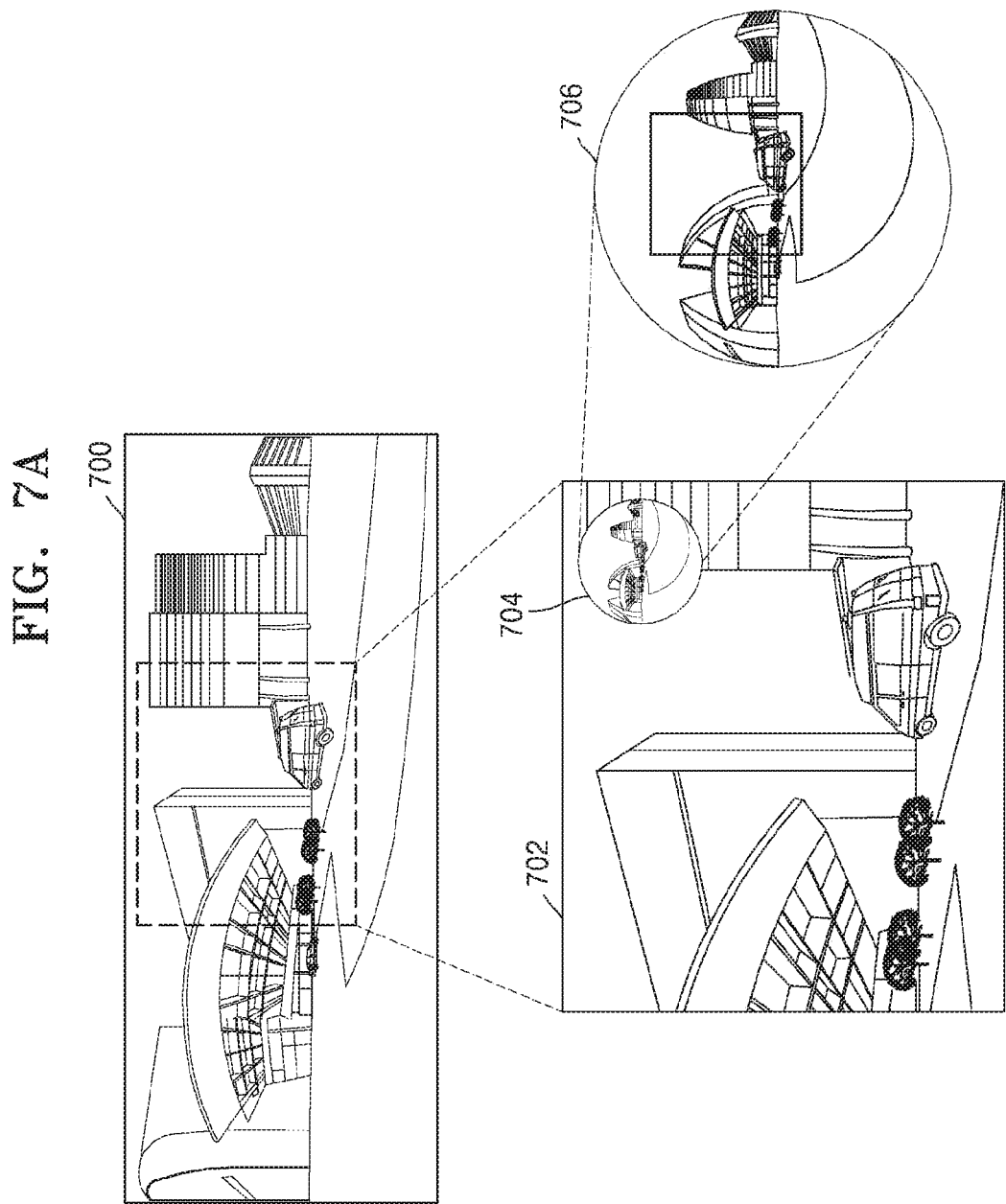

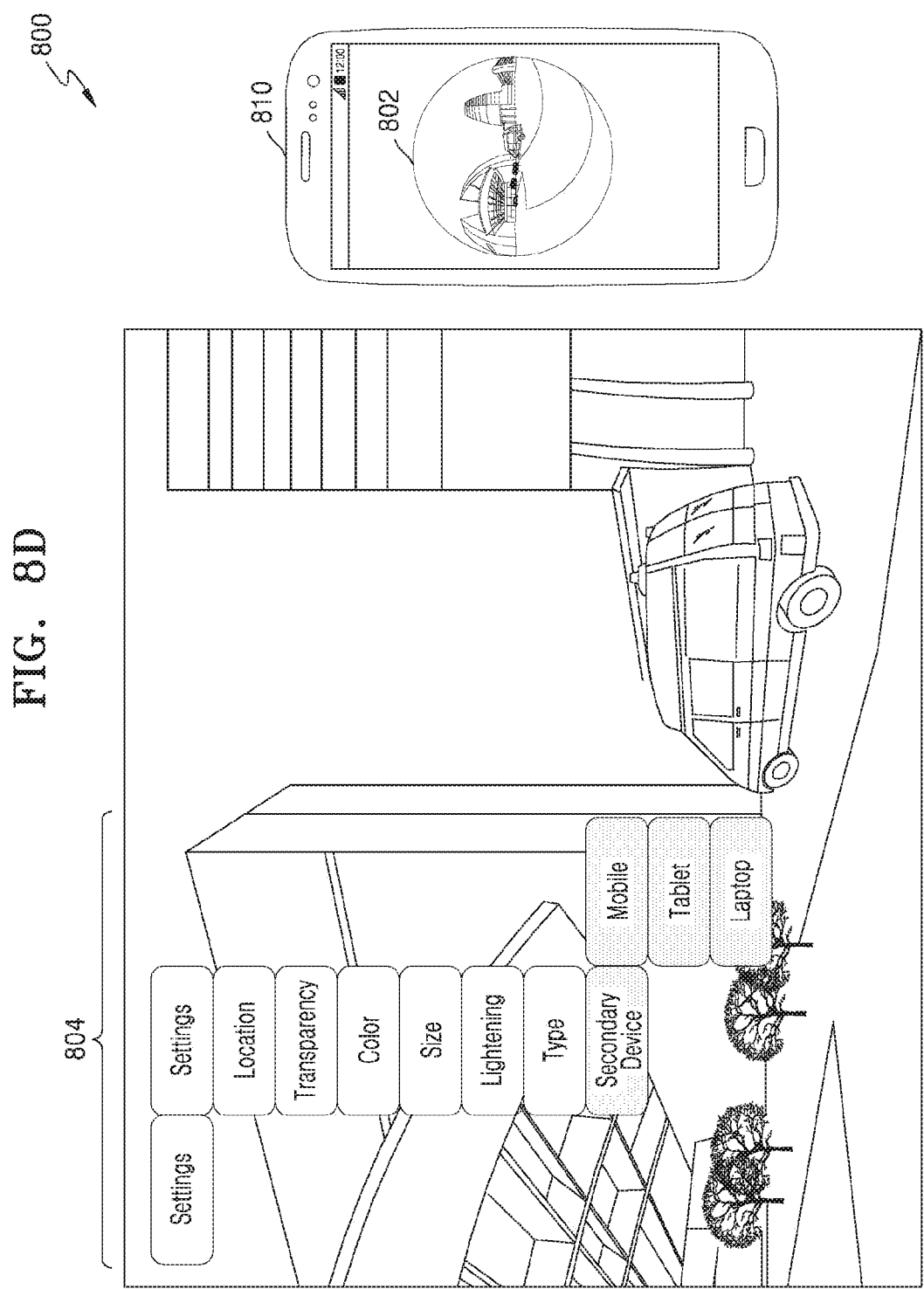

METHOD AND APPARATUS FOR MANAGING A WIDE VIEW CONTENT IN A VIRTUAL REALITY ENVIRONMENT

CROSS-REFERENCE TO RELATED APPLICATION(S)

This application is based on and claims priority under 35 U.S.C. § 119 of an Indian patent application number 201711040660, filed on Nov. 14, 2017, in the Indian Patent Office, the disclosure of which is incorporated by reference herein in its entirety.

BACKGROUND

1. Field

The disclosure relates to rendering digital content. More particularly, the disclosure relates to rendering 360° (360 degree) digital content.

2. Description of Related Art

360° digital content, for example, a 360° video or a 360° image, is rendered for users using computing devices, such as standalone virtual reality (VR) devices or smartphones operating with VR devices. During playback of the 360° digital content, the computing devices render the 360° digital content in a such way that a viewer can watch the 360° digital content from any direction. However, at any instant of time, a 360° view of the 360° digital content is available for viewing, the computing devices provide only a limited viewing angle, up to maximum 120°, to the viewer. In other words, although complete omnidirectional 360° digital content is always available for viewing, the viewer's view remains restricted to one portion of the 360° digital content during playback.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method of managing wide view content in a virtual reality (VR) environment.

Additional aspects will be set forth in part in the description which follows and, in part, will be apparent from the description, or may be learned by practice of the presented embodiments.

In accordance with an aspect of the disclosure, a method of managing wide view content in a VR device is provided. The method includes receiving content covering a wider viewing angle than a viewing angle of a user of the VR device, displaying, on the VR device, a first view displaying at least one portion of the content covering the viewing angle of the user on a first view area of a display of the VR device, and a second view covering the wider viewing angle of the content using convex projection on a second view area of the display.

In an embodiment of the disclosure, the content comprises content with coverage of 360 degree viewing angle.

In an embodiment of the disclosure, the first view is provided from an in-focal view point within a VR sphere where the content is rendered on an inner surface of the VR sphere, and the second view is provided from an out-focal view point outside the VR sphere on the display of the VR device where the content is rendered on an outer surface of the VR sphere.

In an embodiment of the disclosure, the method further comprises generating the first view based on angle information corresponding to the at least one portion of the content covering the viewing angle of the user on the first view area of the display of the VR device.

In an embodiment of the disclosure, the method further comprises generating the second view based on metadata associated with the content.

In an embodiment of the disclosure, the method further comprises connecting to a device via a network, and transmitting the second view to the device for displaying the second view covering the wider viewing angle of the content using convex projection on a display of the device.

In an embodiment of the disclosure, the method further comprises displaying a configuration setting menu on the first view area of the display of the VR device, wherein the configuration setting menu comprises at least one of shape, location, a degree of transparency, color, type of the second view, or a device to be connected for displaying the second view.

In an embodiment of the disclosure, the method further comprises interchanging the first view and the second view in terms of at least one of size, location, and shape of each of the first view and the second view on the display of the VR device.

In an embodiment of the disclosure, the method further comprises rotating the second view in response to a user input at a predetermined interval while the first view is halted.

In an embodiment of the disclosure, the method further comprises halting the rotation of the second view in response to a user input.

In an embodiment of the disclosure, the method further comprises extracting angle information of the content from the content covering the wider viewing angle than the viewing angle of the user of the VR device, wherein the displaying of the first view and the second view comprises displaying the first view and the second view based on the angle information.

In an embodiment of the disclosure, the method further comprises rotating the first view and the second view according to a user input of the user and the angle information.

In an embodiment of the disclosure, the user input comprises at least one of head movement, an eye movement, a text input or gesture input of the user.

In an embodiment of the disclosure, changing of the first view and the second view comprises synchronizing the first view and the second view, and changing, based on the synchronizing of the first view and the second view, the first view and the second view according to the user input of the user and the angle information.

In an embodiment of the disclosure, the first view is displayed using at least one of concave projection or plain projection.

In an embodiment of the disclosure, the second view provides an out-focal view of an in-focal view of the first view.

In accordance with another aspect of the disclosure, an apparatus for managing wide view content is provided The apparatus includes a communication circuit for receiving content covering a wider viewing angle than a viewing angle of a user of the apparatus, and a display for displaying a first view displaying at least one portion of the content covering the viewing angle of the user on a first view area, and a second view covering the wider viewing angle of the content using convex projection on a second view area.

In an embodiment of the disclosure, the apparatus includes at least one processor configured to generate the first view based on angle information corresponding to the at least one portion of the content covering the viewing angle of the user on the first view area of the display, wherein the first view is generated based on an in-focal view point within a VR sphere where the content is rendered on an inner surface of the VR sphere, and wherein the second view is generated based on an out-focal view point outside the VR sphere where the content is rendered on an outer surface of the VR sphere.

In accordance with another aspect of the disclosure, a non-transitory computer readable storage medium having a computer readable program stored therein, the computer readable program, when executed on a first device is provided. The non-transitory computer readable storage medium is configured to execute instructions to cause the first device to receive content covering a wider viewing angle than a viewing angle of a user of the first device, display, on the first device, a first view displaying at least one portion of the content covering the viewing angle of the user on a first view area of a display of the first device, and a second view covering the wider viewing angle of the content using convex projection on a second view area of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B is a view of wide view digital content, according to an embodiment of the disclosure;

FIGS. 7A, 7B, and 7C illustrate view change synchronizations between an in-focal view and an out-focal view, according to various embodiments of the disclosure;

FIGS. 8A, 8B, 8C, and 8D illustrate a graphical user interface (GUI) 800 for setting and changing a plurality of properties of a 3-dimensional (3D) virtual object on which an out-focal view is being rendered, according to various embodiments of the disclosure;

Throughout the drawings, like reference numerals will be understood to refer to like parts, components, and structures.

DETAILED DESCRIPTION

Figure 1:
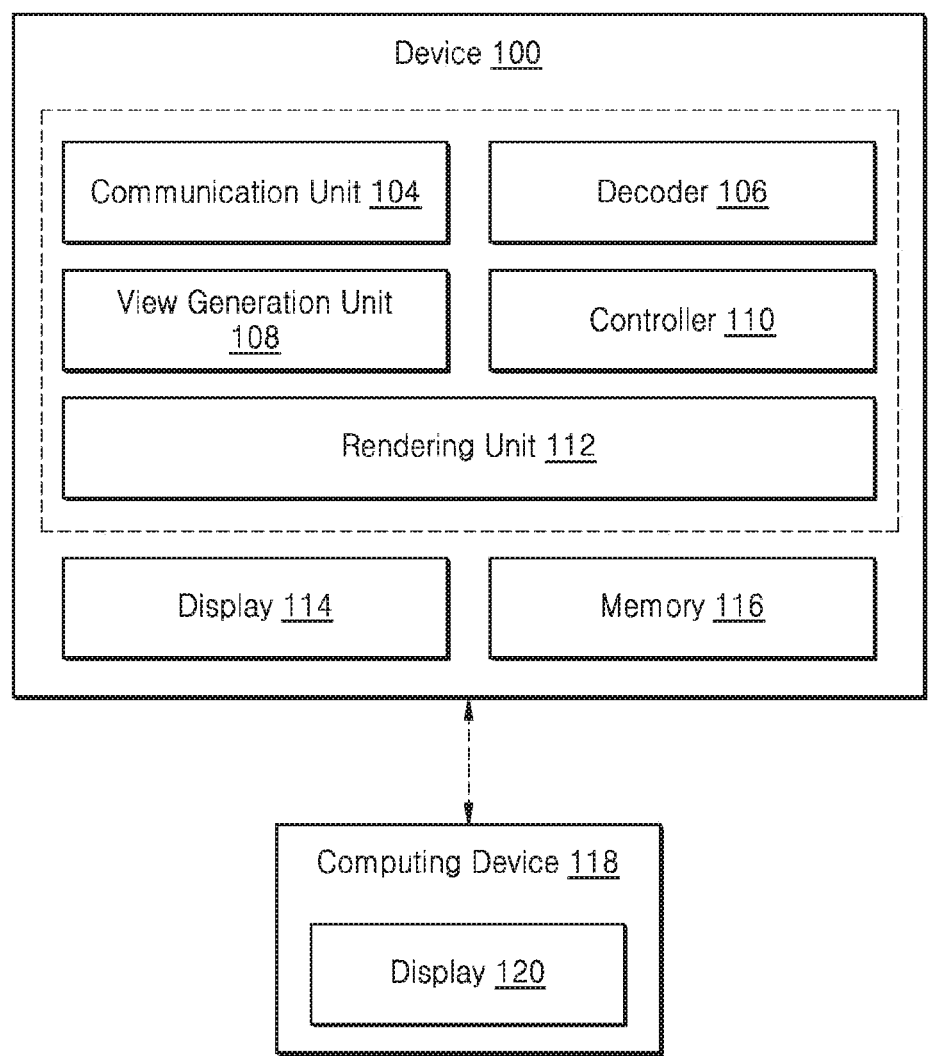
FIG. 1 illustrates a device for rendering wide view digital content in a virtual reality (VR) environment, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits, and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

In order to watch the unexplored view of the 360° digital content, the viewer is required to change the viewing angle continuously towards the missing view. Typically, the user may perform the head movement(s) to change the viewing angle. In some instances, movement of the head may not be a convenient approach for changing the viewing angle. For instance, when the user is travelling in a vehicle, the user's movement is restricted. In such a case, the user may not be able to perform head movements conveniently to change the view.

Nevertheless, in cases where the user can change the viewing angle conveniently, the viewer misses the content being rendered in the previous view.

Thus, the aforementioned techniques of rendering 360° digital content provide a limited or restricted viewing of the 360° digital content being rendered. That is, a user, when watching a portion of the 360° digital content is provided with a single view of a part of the 360° digital content and, is unaware of the content being rendered in the other parts of the 360° digital content. As a result, the user misses the content being rendered in the other parts. In an example, in which the user is watching a 360° video of a sporting event, for example, football, the user may have his focus on a particular portion of the 360° video, while a goal is about to be scored in another view of the 360° video. As the user focuses on only a single part and is unaware of the other portion, the user may miss seeing the goal and thus, user experience is adversely affected.

In another example, the user may be playing a 360° video game wherein the user has to collect hints for completing the game. In such a case, the user may have his focus elsewhere and may not have his focus on a part of the 360° video game where the hint is being displayed. As a result, the user may miss out on the hint and may have to play the game repeatedly. Thus, the user may take multiple attempts to complete the video game.

In another example, the user may avail of services of a virtual tour of a city from a service provider. In such a case, a 360° video of the city is provided for viewing by the user. As the user is provided with only a single view at a given instant of time, the user has to continuously change his look to view the remaining parts of the city. Again, in such a case, the user may not enjoy the virtual tour owing to the restricted view being rendered to the user at any instant of time.

Thus, there a solution is required to overcome at least some of the deficiencies as mentioned above.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

According to an embodiment, a method comprises receiving 360° digital content. The method further comprises generating an in-focal view corresponding to a first portion of the 360° digital content for display on a display unit. Further, the method comprises generating an out-focal view for display on at least one of the display unit and a further display unit, where the out-focal view corresponds to the first portion and an adjoining portion of the 360° digital content, and where the out-focal view provides a perspective representation of the first portion. Further, the method comprises detecting at least one of a view-angle change user input and a change in a field of view with respect of one of the in-focal view and the out-focal view. The method further comprises changing the in-focal view and the out-focal view in correlation to each other, in response to the detecting.

According to another embodiment, a system comprises a communication unit (e.g., a communication circuit or a transceiver) to receive 360° digital content. The system further comprises a view generation unit to generate an in-focal view corresponding to a first portion of the 360° digital content for display on a display unit. The view generation unit further is to generate an out-focal view for display on at least one of the display unit and a further display unit, where the out-focal view corresponds to the first portion and an adjoining portion of the 360° digital content, and where the out-focal view provides a perspective representation of the first portion. The system further comprises a control unit to detect at least one of a view-angle change user input and a change in a field of view with respect to one of the in-focal view and the out-focal view. The control unit further is to change the in-focal view and the out-focal view in correlation to each other, in response to the detecting.

According to another embodiment, a method comprises receiving 360° digital content. The method further comprises generating an in-focal view corresponding to a first portion of the 360° digital content for display on a display unit. Further, the method comprises generating an out-focal view for display on at least one of the display unit and a further display unit, where the out-focal view corresponds to the first portion and an adjoining portion of the 360° digital content, and where the out-focal view provides a perspective representation of the first portion.

According to another embodiment, a system comprises a communication unit to receive 360° digital content. The system further comprises a view generation unit to generate an in-focal view corresponding to a first portion of the 360° digital content for display on a display unit. The view generation unit further is to generate an out-focal view for display on at least one of the display unit and a further display unit, where the out-focal view corresponds to the first portion and an adjoining portion of the 360° digital content, and where the out-focal view provides a perspective representation of the first portion.

According to another embodiment, a method comprises receiving 360° digital content. The method further comprises generating an in-focal view corresponding to a first portion of the 360° digital content for display on a display unit. Further, the method comprises generating an out-focal view for display in conjunction with the in-focal view on the display unit, where the out-focal view corresponds to the first portion and an adjoining portion of the 360° digital content, and where the out-focal view provides a perspective representation of the first portion.

According to another embodiment, a system comprises a communication unit to receive 360° digital content. The system further comprises a view generation unit to generate an in-focal view corresponding to a first portion of the 360° digital content for display on a display unit. The view generation unit further is to generate an out-focal view for display in conjunction with the in-focal view on the display unit, where the out-focal view corresponds to the first portion and an adjoining portion of the 360° digital content, and where the out-focal view provides a perspective representation of the first portion.

Referring now to the drawings, and more particularly to FIGS. 1 through 12, where similar reference characters denote corresponding features consistently throughout the figures, there are shown preferred embodiments.

FIG. 1 illustrates a device 100, according to an embodiment of the disclosure.

According to an embodiment, the device 100 may be a virtual reality (VR) device. In operation, the device 100 renders an in-focal view corresponding to a first portion of digital content containing a wide view, for example, 360 degree view. The term "in-focal", as used herein, may be understood as a current view observed by a user from a focal point of a sphere, where the focal point is a point within the sphere, and where the wide view digital content is being rendered on an inner surface of the sphere. In addition to rendering the in-focal view, according to an embodiment, the device 100 may render an out-focal view of the wide view digital content. The term "out-focal", as used herein, may be understood as a view observed from a focal point outside the sphere, where the wide view digital content is being rendered on an outer surface of the sphere. Rendering of the out-focal view enables the user to simultaneously experience an enlarged or complete view of the 360° digital content along with the in-focal view. As a result, while viewing the in-focal view corresponding to the first portion of the wide view digital content, the user does not miss another portion of the 360° digital content being simultaneously rendered with the in-focal view. Additionally, the out-focal view facilitates the user to conveniently navigate to a desired portion of the wide view digital content. Throughout the specification, the term "wide view digital content" or "wide view content" may be used with various angle view digital content 360° or 360° view content interchangeably. However, the wide view is not limited merely to 360° view or 360° viewing angle. The wide view may cover any angle view between 0° and 360° viewing angle.

According to an embodiment, the device 100 may include a communication unit 104, a decoder 106, a view generation unit 108 (e.g., a view generator), a controller 110 (e.g., at least one processor), a rendering unit 112 (e.g., a renderer), and a display 114. Any combination of the communication unit 104, the decoder 106, the view generation unit 108, the controller 110, and the rendering unit 112 may be implemented as, signal processor(s), state machine(s), logic circuitries, and/or any other device or component that capable of manipulating signals based on operational instructions. Further, any combination of the communication unit 104, the decoder 106, the view generation unit 108, the controller 110, and the rendering unit 112 can be implemented in hardware, instructions executed by a processor. The processor may comprise a computer, a processor, a state machine, a logic array or any other suitable devices capable of processing instructions. The processor can be a general-purpose processor, which executes instructions that cause the general-purpose processor to perform required tasks, or, the processor can be dedicated to perform the required functions. In another example, any combination of the communication unit 104, the decoder 106, the view generation unit 108, the controller 110, and the rendering unit 112 may be machine-readable instructions (software) which, when executed by a processor/processing unit, perform any of the described functionalities.

The device 100 further includes memory 116. The memory 116 may be a repository/storage medium/data store, for storing data processed, received, and generated by one or more of the view generation unit 108, the controller 110, and the rendering unit 112. The following description describes operations of the device 100, in accordance with embodiments of the disclosure.

According to an embodiment, the communication unit 104 (e.g., a communication circuit or a transceiver) may receive wide view digital content after establishing a network connection with a server or a computing device 118 in a wired or a wireless network environment. Examples of the wide view digital content include, but are not limited to, a 360° image or an image with a viewing angle less than 360°, a 360° video or a video with a viewing angle less than with a viewing angle less than 360°, a 360° frame at a specific instant of time in a 360° video or a video with a viewing angle less than 360°, and a 360° digital model or a digital model with a viewing angle less than 360°. According to an embodiment, the communication unit 104 may receive the wide view digital content from an online stream hosted by a server. In another example, the communication unit 104 may receive the wide view digital content from a computing device 118. Examples of the computing device 118 may include, but are not limited to, a smartphone, a desktop, a laptop, a tablet, and the like. In addition to the wide view digital content, the communication unit 104 may also receive metadata associated with the wide view digital content. The metadata may include content view information, angle information related to the wide view digital content, and data related to one or more events occurring within the wide view digital content. The content view information may indicate the most viewed portions of the wide view digital content. According to an embodiment, the communication unit 104 may store the wide view digital content and the metadata associated with the wide view digital content in the memory 116.

According to an embodiment, the decoder 106 may access the wide view digital content and, may extract a first portion and an adjoining portion of the wide view digital content. The adjoining portion may be understood as a portion of the wide view digital content adjacent to the first portion. For example, if the first portion spans from −60° to +60°, the adjoining portion may include −30° and +30° on either side of the first portion, respectively. The decoder 106 may further extract angle information associated with the first portion and the adjoining portion from the metadata associated with the wide view digital content. The angle information associated with a portion of the wide view digital content may be understood as information about angular span of the portion. For instance, in the above example, the angle information associated with the first portion may indicate that the first portion spans from −60° to +60°. The angle information is used for rendering the portion.

According to an embodiment, the view generation unit 108 may generate an in-focal view corresponding to the first portion of the wide view digital content for display on the display 114. The view generation unit 108 may generate the in-focal view based on the angle information corresponding to the first portion. Further, the view generation unit 108 may generate an out-focal view for display on at least one of the display 114 and a further display unit, such as the display 120. The out-focal view corresponds to the first portion and the adjoining portion of the wide view digital content and provides a perspective representation of the first portion. In an example, the view generation unit 108 may generate the out-focal view based on the angle information corresponding to the first portion and the adjoining portion. In another example, the view generation unit 108 generates the out-focal view based on an opposite portion, the opposite portion being a portion of the wide view digital content opposite to the first portion. In other words, if the first portion corresponds to a viewing angle of 120 degrees spanning from −60 degree to +60 degree, the opposite portion corresponds to a viewing angle of 120 degrees spanning from −120 degree to +120 degree.

In another embodiment, the view generation unit 108 may generate a marker based on the first portion for display in the out-focal view. The marker may be shaped as a circle, a rectangle, a square, or any other geometric form. The marker may serve as a contour and encompass the first-portion rendered in the out-focal view. In an example, the rendering unit 112 may display the marker in the out-focal view.

In addition to the angle information, the view generation unit 108 may generate the out-focal view based on the metadata associated with the wide view digital content. For instance, based on the content view information included in the metadata, the view generation unit 108 may generate a heatmap indicative of most viewed portions for display in the out-focal view. As a result, when the user is viewing the out-focal view concurrently with the in-focal view, the user may be aware of the most viewed portions of the wide view digital content based on the heatmap. In another example, the metadata may include one or more tags. In this example, the view generation unit 108 may generate the out-focal view such that the tags are displayed on the out-focal view. The tags, for example, are indicative of the most viewed portions of the content. In another example, the tags may be related to regions of interests, such as geographical monuments and landmarks included in the content. In another example, the tags may indicate certain locations, for example, restaurants, movie halls, shopping malls, bus-stops, and the like. In an embodiment, the tags may be generated in real time based on a user query. For instance, the user may provide a search query for restaurants in the computing device 118. The computing device 118 may transmit information related to the results returned in response to the search query to the device 100. Based on the information, the view generation unit 108 may generate the tags for display on the out-focal view.

As described above, the view generation unit 108 may generate the out-focal view for display on at least one of the display 114 and/or the display 120 of the computing device 118. In an embodiment, the view generation unit 108 may generate the out-focal view for display in conjunction with the in-focal view on the display 114. In the embodiment, the rendering unit 112 may facilitate display of the out-focal view in conjunction with the in-focal view on the display 114. The rendering unit 112 may facilitate display of the in-focal view in a first area of the display 114 and display of the out-focal area in a second area of the display 114. According to an embodiment, the first area and the second area may be rendered distinctively. In another example, the first area and the second area may be rendered such that the second area is superimposed on the first area or vice versa. Thus, the in-focal view and out-focal view are displayed in conjunction with each other. In another embodiment, the view generation unit 108 may generate the out-focal view to be displayed on the display 120. In the embodiment, upon an establishment of a network connection between the device 100 and the computing device 118, the communication unit 104 may transmit the out-focal view or the content portion corresponding to the out-focal view to the computing device 118 such that the computing device 118 may be able to display the out-focal view on the display 120 using convex projection.

According to an embodiment, the second area or an area of the display 120 in which the out-focal view is rendered may be in the form of a 3-dimensional (3D) virtual object where the first portion and the adjoining portion are rendered or displayed on an outer surface of the 3D virtual object. Examples of the 3D virtual object may include, but are not limited to, a sphere, a hemi-sphere, a cube, a cylinder, a cone, and a ring. In an example, the rendering unit 112 may render the first portion about a centre of the outer surface of the 3D virtual object. In another example, the rendering unit 112 may render the first portion about a top of the outer surface of the 3D virtual object.

According to an embodiment, the controller 110 may detect at least one of a view-angle change user input and a change in a field of view with respect to one of the in-focal view and the out-focal view. The view-angle change user input may be understood as a user input received through a control interface (not shown). In another example, the user may provide the view-angle change user input as an audio input, for example, a voice command. The control interface may be provided in a physical form on the device 100. As another example, the controller 110 may be provided as a digital interface either on the device 100 or on the computing device 118. The viewing angle change user input may be received for either of the in-focal view and the out-focal view. For instance, on accessing or activating the control interface, the user may be provided with an option to select one of the in-focal view and the out-focal view. Based on the user selection, the control interface affects change in the selected view, i.e., either the in-focal view or the out-focal view. The change of the view-angle in the field of view may be brought about by a movement of the user, for example, a movement of the user's head or eye in a specific direction. The change in the field of view may be detected by one or more sensors (not shown) of the device 100. According to an embodiment, the change of the viewing angle in the field of view may be received with respect to only the in-focal view.

In response to the detecting, the controller 110 may change the in-focal view and the out-focal view in correlation to each other. According to an embodiment, where the change in the field of view is detected or where the view-angle change user input is received with respect to the in-focal view, the controller 110 may detect a direction of movement. For each degree change in the direction of movement, the controller 110 may identify corresponding portion of the wide view digital content, which is to be rendered to the user. On identifying the portion, the controller 110 may trigger the decoder 106 to extract the portion and angle information related to the portion from the memory 116. Based on the extracted portion and the angle information, the view generation unit 108 may generate the in-focal view and the out-focal view, which are to be rendered to the user. Based on the direction of movement, the in-focal view, and the out-focal view, the controller 110 may change the in-focal view and the out-focal view in correlation. That is, for per degree change in the in-focal view and the direction of movement, the controller 110 may compute a degree value by which the 3D virtual object is to be rotated. Subsequently, the controller 110 may transmit instructions to the rendering unit 112 to cause display of the in-focus view and the out-focal view. The instructions may include the direction of movement and the degree value. On receiving the instructions, the rendering unit 112 may cause display of the in-focal view on the display 114 and display of the out-focal view on the display 114 and/or the display 120 based on the direction of movement and the degree value. Thus, the controller 110 may change the in-focal view and the out-focal view in correlation to each other. In an embodiment, the change in the in-focal view and the out-focal view may occur simultaneously in a seamless manner. That is to say, for each degree change in the in-focal view, the 3D virtual object is rotated by the corresponding degree value and the out-focal view rendered on its outer surface changes in synchronization therewith.

In another example, where the viewing angle change user input is received with respect to the out-focal view, the controller 110 may change the in-focal view and the out-focal view in correlation in a manner as described above. In this example, the controller 110 may detect the direction of movement with respect to the out-focal view, and for per degree change in the direction of movement, may compute a degree value by which the in-focal view is to be rotated. Accordingly, the controller 110 prepares instructions for the rendering unit 112 for changing the out-focal view and the in-focal view in correlation. On receiving the instructions, the rendering unit 112 may facilitate display of the in-focal view and out-focal view through the display 114 and/or display 120. As described above, the change in the in-focal view and the out-focal view may occur simultaneously in a seamless manner. Thus, in response to the detecting, the controller 110 changes the in-focal view and the out-focal view in correlation to each other.

According to an embodiment, the controller 110 may detect a control input. The control input may be understood as a user input for enabling/disabling an operation mode of the device 100. For example, the user may provide the control input using one of a voice command, a control interface, a touch gesture, a text input or any combination thereof. Based on the control input, the controller 110 enables a first operation mode of the device 100, where the controller 110 disables the correlation between the in-focal view and the out-focal view. Subsequently, the user may be presented with an option to halt a rotation or a view change of one of the in-focal view and the out-focal view. In response, a user selection to halt a movement of one of the in-focal view and the out-focal view is received by the device 100. Where the user selection is to halt the movement of the in-focal view, the controller 110 may halt the movement of the in-focal view and the controller 110 may enable rotating of the out-focal view based on a control input. In another embodiment, where the user selection is to halt the movement of the out-focal view, the controller 110 may halt the movement of the out-focal view. Subsequent to the halting, the controller 110 may detect one of the viewing angle change user input and the change in field of view with respect to one of the in-focal view and the out-focal view. Based on the halting and detecting, the controller 110 may change only one of the in-focal view and the out-focal view. For example, in a case where the in-focal view movement is halted and the view-angle change user input is received with respect to the out-focal view, the controller 110 may change the out-focal view without changing the in-focal view. In another case where the out-focal view is halted and one of the view-angle change user input or the change in field of view is received with respect to the in-focal view, the controller 110 may change the in-focal view without changing the out-focal view. According to an embodiment, the controller 110 may receive a further control input for disabling the first operation mode. Based on the further control input, the controller 110 may disable the first operation mode. Thus, the in-focal view and the out-focal view are again in correlation.

As described above, the rendering unit 112 may facilitate display of the in-focal view on the display 114 and display of the out-focal view on the display 120. In an embodiment, the user may provide a view-angle change user input with respect to the out-focal view through the computing device 118. Upon receiving the view-angle change user input from the user, the computing device 118 transmits a view-angle change request to the device 100. The view-angle change request includes the view-angle change user input. According to an embodiment, the communication unit 104 may receive the view-angle change request from the computing device 118. Based on the view-angle change user input, the controller 110 may change the in-focal view in a manner as described above. As may be noted, the change in the in-focal view based on the view-angle change user input is in correlation to the change in the out-focal view being rendered on the display 120. For instance, the user may rotate the 3D virtual object and, accordingly, the out-focal view and the in-focal view change in synchronization with the rotation of the 3D virtual object.

As described above, the rendering unit 112 may facilitate the display of the in-focal view in the first area of the display 114 and display of the out-focal view in the second area of the display 114. According to an embodiment, the controller 110 may detect a view-switch user input. The view-switch user input may be understood as a user input for switching the display areas of the in-focal view and the out-focal view. According to an embodiment, the user may provide the view-switch user input using one of a voice command, a control interface, a touch gesture, a text input or any combination thereof. On detecting the view-switch user input, the controller 110 may instruct the rendering unit 112 to switch the in-focal view and the out-focal view, i.e., display the out-focal view in the first area and the in-focal view in the second area. Based on the instructions received from the controller 110, the rendering unit 112 may facilitate display of the in-focal view in the second area and, display of the out-focal view in the first area.

According to an embodiment, the controller 110 may detect one of a control input, a user profile, an application being executed, metadata, and a content being rendered. The control input, may be an input for modifying properties, such as shape, size, transparency, position, theme, brightness, and the like, of the 3D virtual object or the out-focal view. The detection of the user profile may include identifying user preferences based on the user profile stored in the memory 116. The detection of the executed application, for example, a VR application, includes identifying predefined display settings with respect to the out-focal view. For instance, the VR application may have a defined display area for displaying the out-focal view. The detection of the metadata may include identifying instructions related to the displaying of the out-focal view based on the metadata. For instance, displaying of the heatmap or tags on the out-focal view may be detected based on the metadata. The detection of the content being rendered may include identifying instructions related to displaying of the out-focal view with respect to the out-focal view. For instance, specific content may require that the out-focal view be presented in a smaller display area or in a transparent manner.

In response to the detecting, the controller 110 may change at least one of a size, a shape, a color, a transparency, a position, a theme, and a brightness of the out-focal view. For instance, the controller 110 may detect the control input to be with respect to changing the position of the out-focal view. Based on the control input, the controller 110 may instruct the rendering unit 112 to change the position of the out-focal view. In another example, the controller 110 may detect that the device 100 or the computing device 118 is in a silent profile mode. In such a mode, no notifications may be displayed to the user. Accordingly, the controller 110 instructs the rendering unit 112 to not facilitate displaying of event notifications based on the user profile.

According to an embodiment, the communication unit 104 may receive an event notification corresponding to an event from one of a client device, such as the computing device 118 and a server (not shown), such as the server hosting the online stream. For instance, in a case where the device 100 is receiving the wide view digital content from the computing device 118, the device 100 may receive the event notification from the computing device 118. In another case where the device 100 is receiving the wide view digital content from the server, the device 100 may receive the event notification from the server. The event may be an action event related to the wide view digital content. For example, the wide view digital content may be a football match recording and in such a case, the event may be a goal scored. In another case, the event may be a text message or a service message. According to an embodiment, the controller 110 may control the event notification to be displayed on the out-focal view. In this example, the controller 110 may instruct the rendering unit 112 to render the notification on the out-focal view. The rendering unit 112 subsequently, may facilitate the event notification to be displayed on the out-focal view.

As described above, tags may be displayed on the out-focal view. For example, the user may seek to view a tagged object and accordingly, provide a tag-object user input for viewing the tagged object. The controller 110 may receive the tag-object user input with respect to the tagged object being displayed on the out-focal view. In response to receiving the tag-object user input, the controller 110 may change the in-focal view and the out-focal view to facilitate display of the tagged object in the in-focal view and the out-focal view.

FIGS. 2A, 2B, 3, and 4 illustrate methods 200, 250, 300, and 400 for rendering wide view digital content, according to various embodiments of the disclosure.

The order in which the methods 200, 250, 300, and 400, are described is not to be construed as a limitation, and any number of the described method blocks can be combined in any order to implement the methods 200, 250, 300, and 400, or an alternative method. Additionally, individual blocks may be deleted from the methods 200, 250, 300, and 400 without departing from the scope of the subject matter described herein. Furthermore, the methods 200, 250, 300, and 400 can be implemented in any suitable hardware, software, firmware, or combination thereof.

Figure 2A:
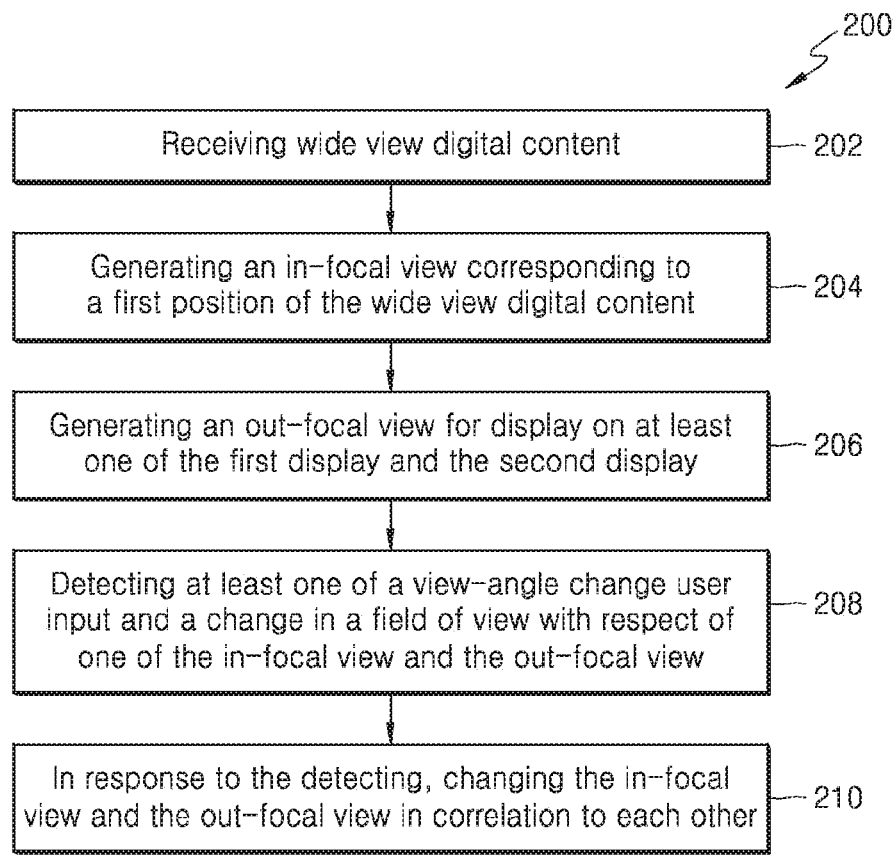
FIGS. 2A and 2B illustrate methods of rendering wide view digital content, according to various embodiments of the disclosure.

Referring to FIG. 2A, in operation 202, the device 100 may receive wide view digital content. In another example, a computing device 118, such as a smartphone, a VR device, a desktop, a tablet, and the like, may receive the wide view digital content. Examples of the wide view digital content may include, but are limited to, a 360° image or an image with various angles less than 360°, a 360° video or a video with various angles less than 360°, a 360° frame at a specific time of a 360° video or a frame with various angles less than 360° at a specific time of a video, or a 360° digital mode or a digital mode with various angles less than 360°. According to an embodiment, the device 100 may receive the wide view digital content from an online stream. In another embodiment, the wide view digital content may be received from another computing device. In an embodiment, in addition to the wide view digital content, metadata associated with the wide view digital content may also be received. In an implementation, the communication unit 104 of the device 100 may receive the wide view digital content.

In operation 204, an in-focal view corresponding to a first portion of the wide view digital content is generated. According to an embodiment, the first portion may be extracted from the wide view digital content and angle information corresponding to the first portion is extracted from the metadata. Based on the first portion and the angle information, the in-focal view is generated. According to an embodiment, the view generation unit 108 may generate the in-focal view.

In operation 206, an out-focal view for display on at least one of a display unit and another display unit is generated. According to an embodiment, the out-focal view corresponds to the first portion and an adjoining portion of the wide view digital content and, provides a perspective representation of the first portion. The adjoining portion of the wide view digital content includes at least a portion of the wide view digital content adjoining or adjacent to the first portion. The adjoining portion may be extracted from the wide view digital content and angle information corresponding to the adjoining portion is extracted from the metadata. Based on at least one of the adjoining portion, corresponding angle information, and the first portion, the out-focal view is generated. In an embodiment, a marker may be displayed on a part of the out-focal view area based on the first portion. That is to say, the marker may outline the first portion in the out-focal view. In an embodiment, the view generation unit 108 may generate the out-focal view for display on one of the display 114 and the further display 120.

According to an embodiment, the out-focal view is displayed in conjunction with the in-focal view. According to an embodiment, the in-focal view is displayed in a first area of the display and the out-focal view is displayed in a second area of the display. The second area may be a 3D virtual object, where the first portion and the adjoining portion are rendered on an outer surface of the 3D virtual object. The first portion may be rendered about a center of the outer surface of the 3D virtual object. The first portion may be rendered about a top of the outer surface of the 3D virtual object. In another example, the first portion may be rendered at any position on the outer surface of the 3D virtual object.

According to an embodiment, the in-focal view is displayed on the first display and the out-focal view is displayed on the second display. The first and second display may be a display, for example, a screen, or a media player, or a web browser player, of the computing device. The second display may be a display of a computing device connected to the device including the first display. When the out-focal view is displayed on the second display, the user may seek to change the out-focal view and accordingly may provide a view-angle change user input through the other computing device. Based on the view-angle change user input, a view-angle change request is generated and transmitted to the computing device. The view-angle change request includes the view-angle change user input. On receiving the view-angle change request, the in-focal view in accordance with angle changes is changed based on the view-angle change user input.

In operation 208, at least one of a view-angle change user input and a change in a field of view with respect to one of the in-focal view and the out-focal view is detected. The view-angle change user input may be received with respect to one of the in-focal view and the out-focal view. According to an embodiment, the view-angle change user input may be received via a control interface. The control interface may be in the form of either hardware or a digital interface. The change in the field of view may be detected using one or more sensors and is received with respect to the in-focal view. The sensors track user's head or eye movement and accordingly facilitate in detection of the change in the field of view. In an embodiment, the controller 110 may detect the change in the view-angle change user input and the change in a field of view.

In operation 210, in response to the detecting, the in-focal view and the out-focal view are changed in correlation to each other. That is to say, for each degree change in the in-focal view, the out-focal view is changed in synchronization therewith and, vice-versa. According to an embodiment, the out-focal view is rendered on a 3D virtual object. Thus, for per degree change in the in-focal view, the 3D virtual object is rotated accordingly. Similarly, for per degree rotation of the 3D virtual object, the in-focal view is changed in sync. According to an embodiment, the controller 110 may change the in-focal view and the out-focal view in response to the detecting.

In an embodiment, a control input may be received for enabling a first operation mode. In the first operation mode, the correlation between the in-focal view and the out-focal view is disabled. Further, in the first operation mode, one of the in-focal view and the out-focal view may be fixed. After such fixing, one of the view-angle change user input and the change in the field of view may be detected. Where the in-focal view is fixed, the view-angle change user input may be detected with respect to the out-focal view. Similarly, where the out-focal view is affixed, one of the view-angle change user input and the change in the field of view may be detected with respect to the in-focal view. Based on the fixing and the detecting, one of the in-focal view and the out-focal view is changed. For example, if the in-focal view is fixed and the view-angle change user input is received with respect to the out-focal view, the out-focal view is changed. In another example, if the out-focal view is fixed and one of the view-angle change user input and the change in the field of view is detected with respect to the in-focal view, the in-focal view is changed. According to an embodiment, a further control input is received for disabling the first operation mode and, subsequently the first operation mode is disabled.

Figure 2B:
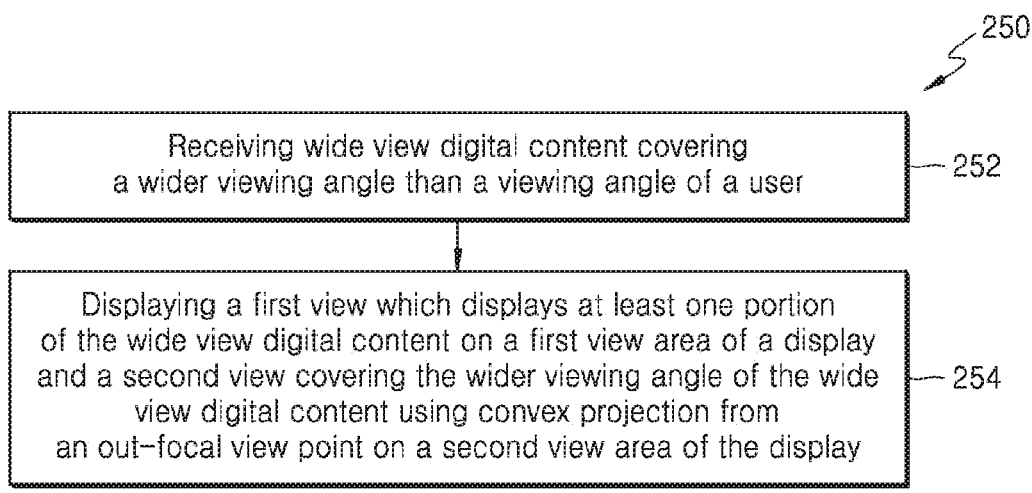

Referring to FIG. 2B, in operation 252, the device 100 may receive wide view digital content which covers a wider viewing angle than a viewing angle of a user of the device 100. In operation 254, the device 100 may display a first view which displays at least one portion of the wide view digital content on a first view area of a display of the device 100 and a second view covering the wider viewing angle of the wide view digital content using convex projection from an out-focal view point on a second view are of the display of the device 100. The first view may be provided using concave projection from an in-focal view point within a VR sphere wherein the wide view digital content is rendered on an inner surface of the VR sphere as will be described in detail referring to FIG. 5A.

Figure 3:
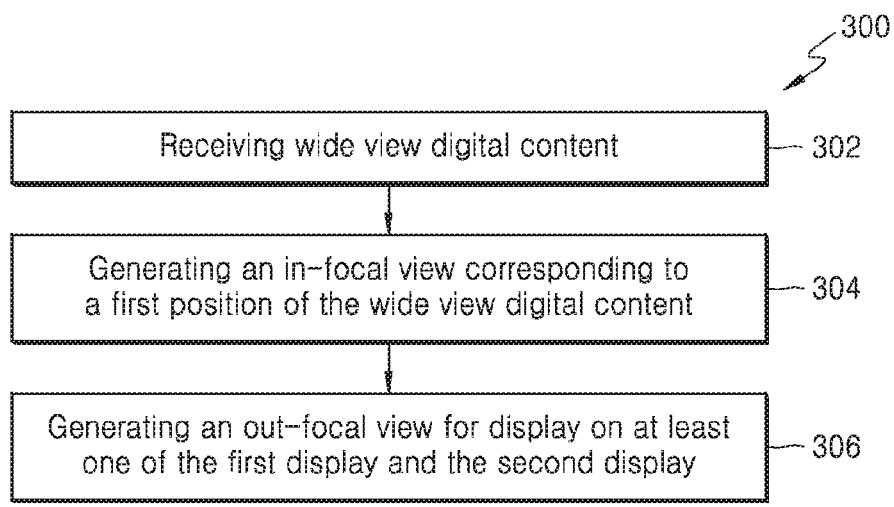
FIG. 3 illustrates a method of rendering wide view digital content, according to an embodiment of the disclosure.

Referring to FIG. 3, operations 302, 304, and 306 are analogous to operations 202, 204, and 206 in FIG. 2A respectively, and are performed in a similar manner as described above. Once the in-focal view and the out-focal view are generated, a view-angle change user input is detected. The view-angle change user input may be received with respect to one of the in-focal view and the out-focal view. In response to the detecting, the in-focal view and the out-focal view are changed. According to an embodiment, the in-focal view and the out-focal view may be changed in correlation to each other. In an example, the controller 110 may detect the view-angle change user input and, in response to the detection changes the in-focal view and the out-focal view.

Figure 4:
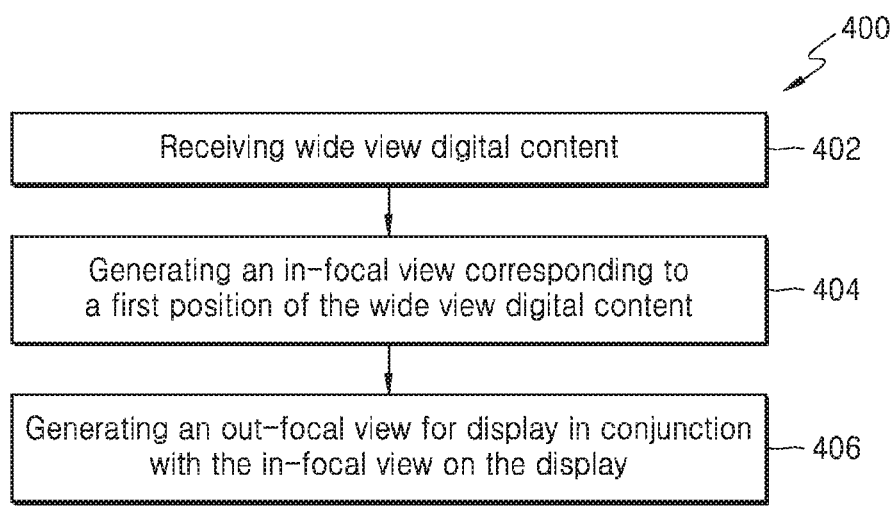
FIG. 4 illustrates a method of rendering wide view digital content, according to an embodiment of the disclosure.

Referring to FIG. 4, operations 402 and 404 are analogous to operations 202 and 204 in FIG. 2A, respectively, and are performed in a similar manner as described above. Referring to operation 406, an out-focal view for display in conjunction with the in-focal view on the display is generated. The out-focal view corresponds to the first portion and an adjoining portion and, provides a perspective representation of the first portion. According to an embodiment, the out-focal view is generated based on the angle information corresponding to the first portion and the adjoining portion. According to an embodiment, the generation of the out-focal view may be further based on the metadata. The metadata may include content view information about one or more most viewed portions of the wide view digital content. Based on the content view information, a heatmap may be displayed on the out-focal view. In another example, one or more tags may be displayed on the out-focal view based on the metadata. The tags may correspond to objects, such as restaurants, monuments, cafes, bus-stops, landmarks, and the like, being rendered in the out-focal view. In this example, a tag-object user input may be received with respect to a tagged object being displayed on the out-focal view. In response to receiving the tag-object user input, the in-focal view and the out-focal view are changed to display the tagged object in the in-focal view and the out-focal view. For example, the user may select a tag corresponding to a monument being rendered on the out-focal view. Based on the user selection, the in-focal view and the out-focal view are changed to display the monument.

According to an embodiment, the in-focal view and the out-focal view are rendered in conjunction with each other on the display. For instance, the out-focal view may be rendered side by side to the in-focal view. In another case, the out-focal view may be super-imposed on the in-focal view. In an example, the view generation unit 108 may generate the out-focal view for display in conjunction with the in-focal view on the display 114.

According to an embodiment, the in-focal view and the out-focal view are displayed on the display. The in-focal view is displayed in a first area of the display and the out-focal view is displayed on a second area of the display. The second area is in the form of a 3D virtual object and the out-focal view is placed on an outer surface of the 3D virtual object. That is to say, the first portion and the adjoining portion of the out-focal view are rendered on the outer surface of the 3D virtual object. Examples of the 3D virtual object may include, but are not limited to, a sphere, a hemi-sphere, a cube, a cylinder, a cone, and a ring. In an example, the first portion may be rendered about one of a top and a center of the outer surface of the 3D virtual object.

According to an embodiment, in response to the displaying, a view-angle change user input is detected with respect to the in-focal view. Based on the view-angle change user input, the in-focal view and the out-focal view are changed. According to an embodiment, a view-switch user input is detected. Based on the view-switch user input, the in-focal view is displayed in the second area and the out-focal view is displayed in the first area of the display.

According to an embodiment, at least one of a control input, a user profile, an application being executed, metadata, and a content being rendered may be detected. In response to the detecting, at least one of a shape, a size, color, a transparency, a position, a theme, and a brightness of the out-focal view is changed.

According to an embodiment, an event notification corresponding to an event is received. The event notification may be received from a client device, such as the computing device 118 or may be received from a server, such as the server hosting the online stream. The received event notification, in an example may be displayed on the out-focal view.

Figure 5A:
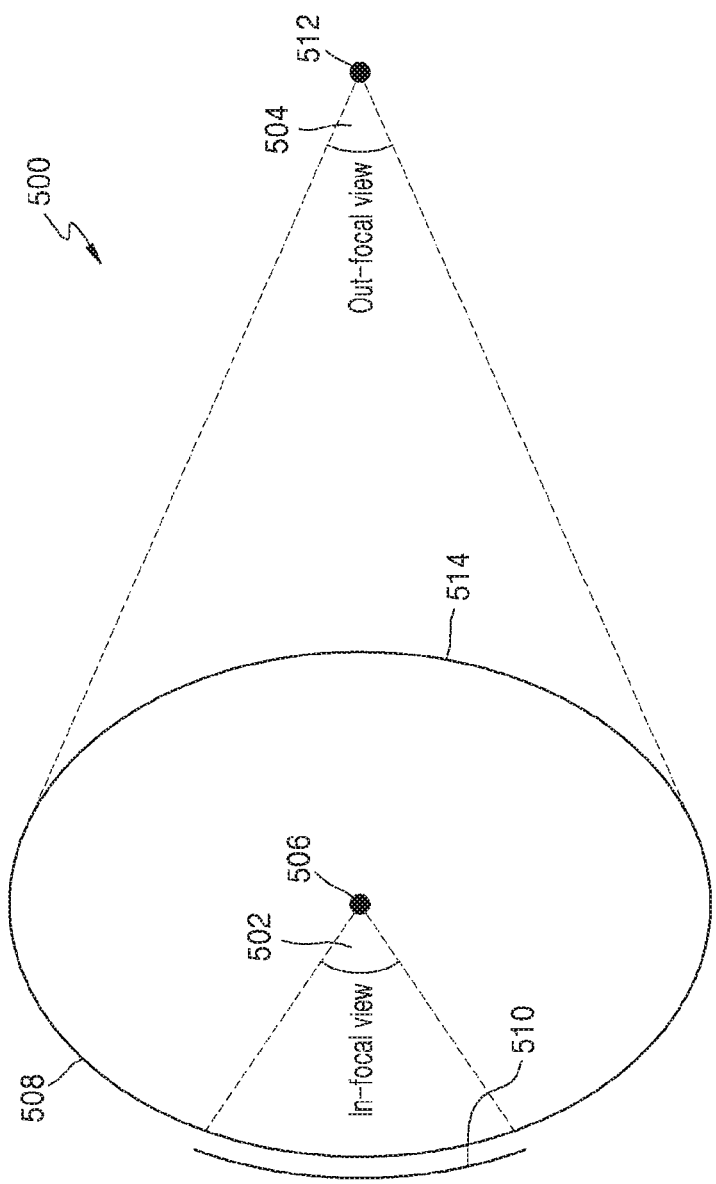
FIG. 5A illustrates a diagram depicting various views of vide view digital content, according to an embodiment of the disclosure.

FIG. 5A illustrates a diagram 500 depicting various views of wide view digital content, according to an embodiment of the disclosure.

The diagram 500 includes an in-focal view 502 and an out-focal view 504. As used herein, the in-focal view 502 may be understood as a view observed by a user from a focal point 506 within a VR sphere 508, where the wide view digital content is being rendered on an inner surface 510 of the VR sphere 508 in a VR environment. The out-focal view 504, as used herein, may be understood as a view observed from a focal point 512 outside the VR sphere 508, where the wide view digital content is being rendered on an outer surface 514 of the VR sphere 508 in the VR environment.

FIG. 5B illustrates a view 516, according to an embodiment of the disclosure.

Referring to FIG. 5B, the view 516 depicts a view generated based on at least a portion of wide view digital content, such as a wide view digital video, a wide view digital image, a wide view digital model, and the like. For instance, as shown in the FIG. 5B, the view 516 is a view of a monument generated based on a portion of a wide view video of the monument. According to an embodiment of the disclosure, the view 516 provides broader coverage or broader view than a current view being viewed by a user. In an example, the view 516 includes an in-focal view 518 and an out-focal view 520. The in-focal view 518 depicts the current view being viewed by the user, where the current view corresponds to a first portion of the wide view digital content. The out-focal view 520 includes a perspective representation of the first portion in addition to an adjoining portion of the wide view digital content. The adjoining portion, for example, includes portion(s) adjacent to the first portion. For instance, the first portion may correspond to a view spanning from +60 to −60 degrees. The adjoining portion may correspond to a view spanning 30 degrees on each side of the first portion thus, providing broader coverage or broader view of the first portion among the wide view digital content. Further shown in the FIG. 5B is an expanded view 522 depicting details of the out-focal view 520. As shown in the expanded view 522, the out-focal view 520 includes perspective representation of the first portion. Further, the out-focal view 520 includes a marker 524 inside the perspective representation of the first portion.

Figure 6:
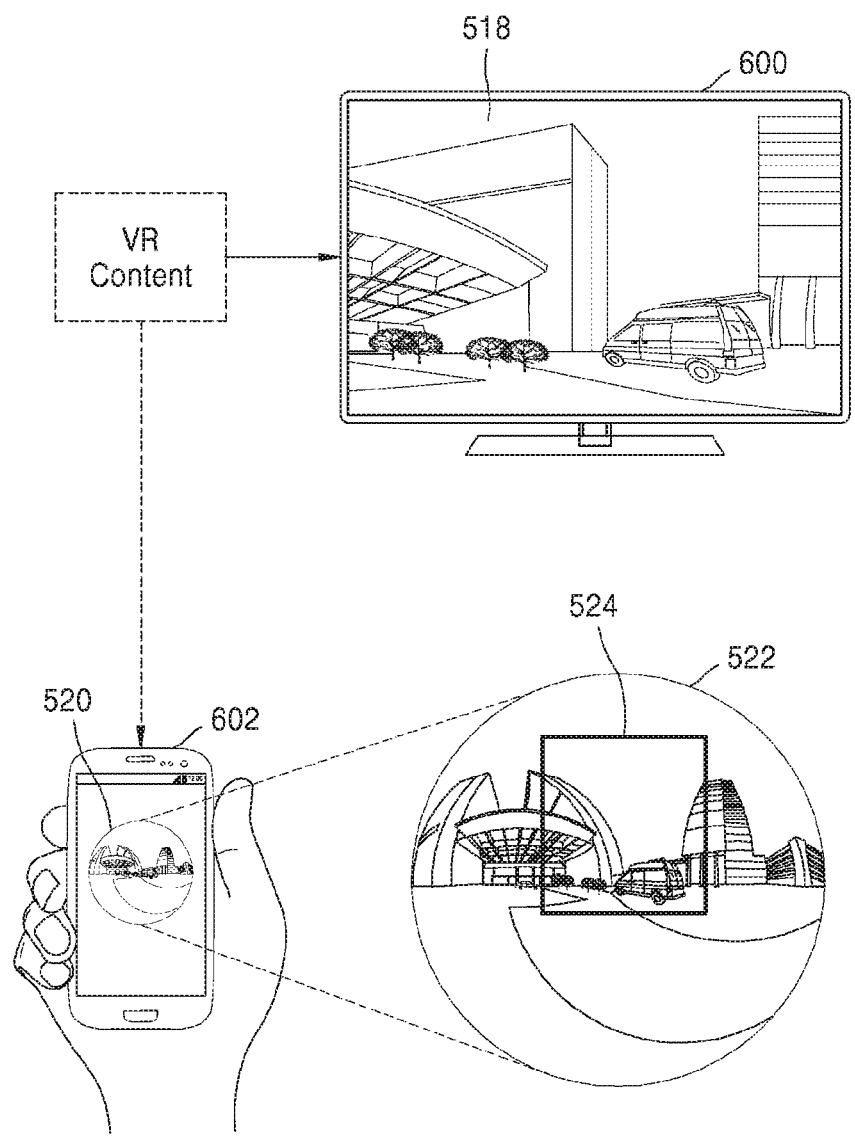
FIG. 6 illustrates the rendering of an out-focal view on a second display, according to an embodiment of the disclosure.

FIG. 6 illustrates the rendering of an out-focal view on a second display, according to an embodiment of the disclosure.

Referring to FIG. 6, rendering of the out-focal view 520 on second display is illustrated. In an embodiment, the user is viewing the in-focal view 518 on a display 600 located at a distance from the user. The user may be viewing the in-focal view 518 on a television. The user may wish to control and explore the wide view digital content in a convenient way. Accordingly, the user may select an option that the out-focal view 520 is rendered on a second display 602. The second display 602 may be a computing device, such as a smart phone, a tablet, a laptop, a smart watch, and the like. Using the out-focal view 520 rendered on the second display 602, the user may easily explore and control the in-focal view 518. For instance, the user may rotate the out-focal view 520 as desired to change the in-focal view 518 being displayed on the television. In another embodiment, the user may drag the marker 524 within the out-focal view 520 for changing the in-focal view 518. Thus, the user can easily control and explore the wide view digital content.

Figure 7B:
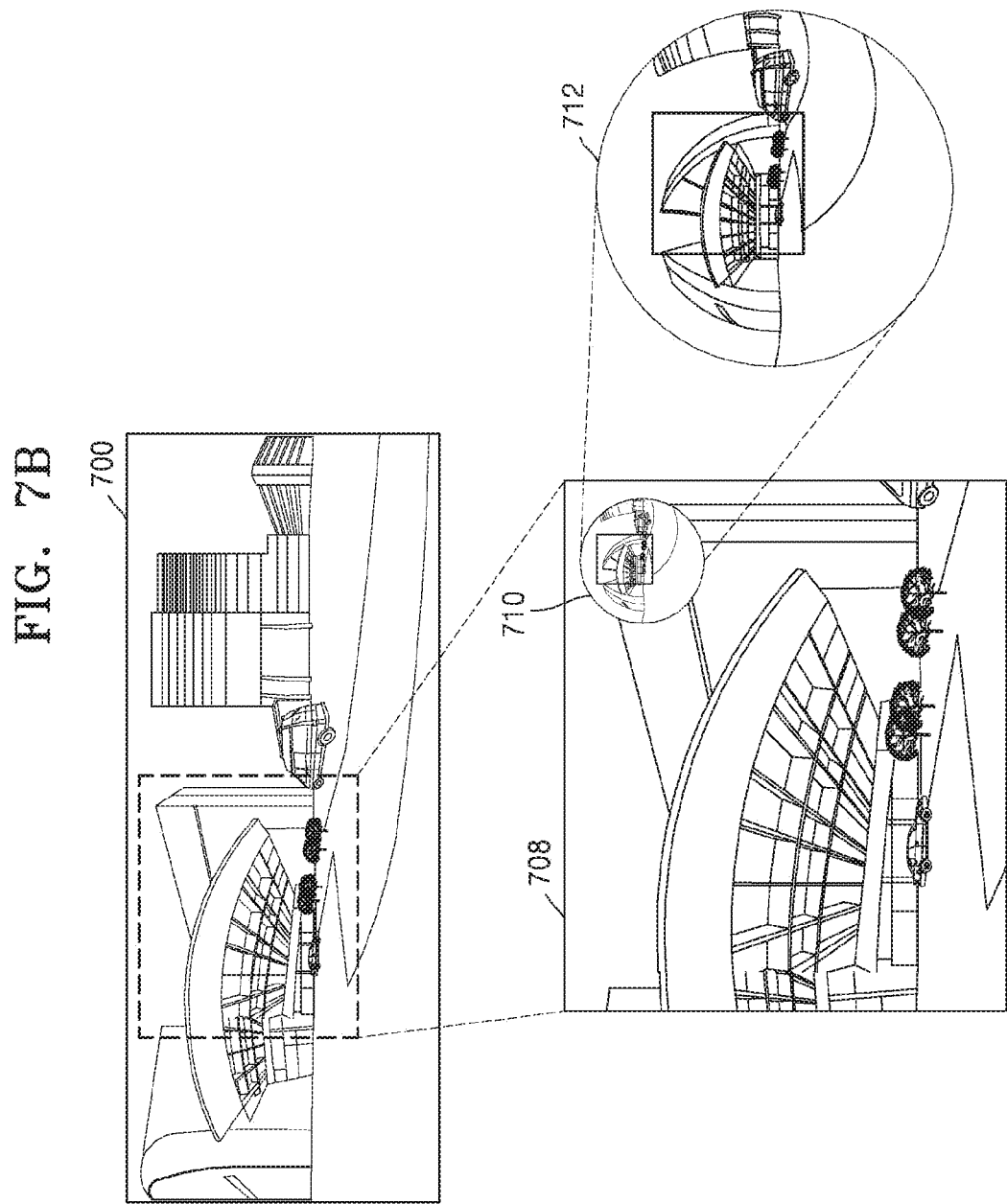
Figure 7C:
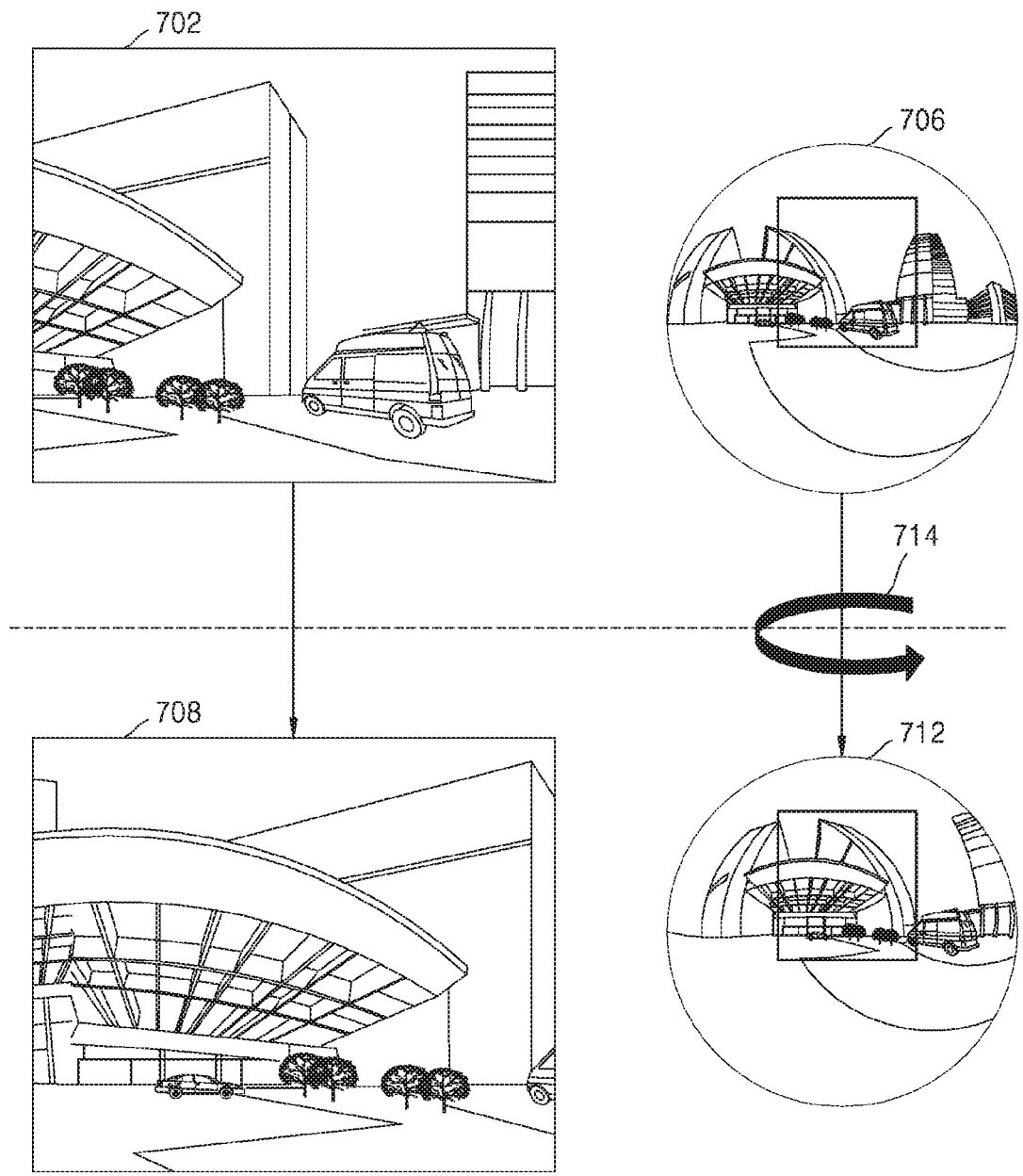

FIGS. 7A, 7B, and 7C illustrate synchronizations between the in-focal view and the out-focal view according to various embodiments of the disclosure.

In an embodiment, the in-focal view and the out-focal view may change in synchronization with each other. For instance, a change in the in-focal view brings a corresponding change in the out-focal view. Likewise, a change in the out-focal view brings a change in the in-focal view. Thus, a user viewing wide view digital content may conveniently change his/her view as desired. FIGS. 7A and 7B illustrate an example embodiment where the user may change the in-focal view using head/body movement/verbal inputs. FIG. 7C illustrates an example embodiment where the user changes the in-focal view using the out-focal view.

Referring to FIG. 7A, a frame 700 is illustrated. According to an embodiment, an in-focal view 702 and an out-focal view 704 may be generated based on the frame 700. Furthermore, an expanded view 706 of the out-focal view 704 is shown in the figure. In an example, a user may seek to view other portions of wide view digital content. To that end, the user may provide a view-angle change user input. For instance, the user may access a control interface (not shown in the figure) and may subsequently change the in-focal view 702 as desired. According to another embodiment, the user may affect a change in the field of view by way of head or eye movement. In yet another embodiment, the user may provide voice commands for affecting the change in the in-focal view 702. In response to the view-angle change user input or the change in the field of view, the in-focal view 702 changes to in-focal view 708, as shown in the FIG. 7B. At the same instant of time, a corresponding change is affected in the out-focal view 704 and the out-focal view 704 changes to out-focal view 710 as shown in FIG. 7B. The expanded view 712 of the out-focal view 710 is also shown.

As described above, the out-focal view is rendered on a 3D virtual object. According to an embodiment, the change in the out-focal view from 704 to 710 is viewed as a 3D rotational visual effect of the 3D virtual object. The 3D rotational effect is rendered on the display of the computing device rendering the wide view digital content. The computing device may play the wide view digital content using a media player running on the computing device or in a browser application of the computing device. Thus, the in-focal view and the out-focal view change in synchronization with each other based on changes in the in-focal view. Further, the expanded view of the out-focal view 710 is also shown in FIG. 7B.

Referring to FIG. 7C, the in-focal view 702 and the out-focal view 704 may be changed by a view-angle change user input received with respect to the out-focal view 704. According to an embodiment, for changing the in-focal view 702, the user may rotate a 3D virtual object on which the out-focal view 704 is being rendered. For instance, the user provides a user input 714 for rotating a sphere on the outer surface of which the out-focal view 704 is rendered. According to an embodiment, the user may drag a marker 716 provided in the out-focal view 704 for changing the out-focal view 704 and accordingly, the in-focal view 702 as well. As may be understood, the user may drag the marker 716 to any portion of the out-focal view to view the corresponding in-focal view. In an embodiment, dragging of the marker 716 may cause rotation of 3D virtual object. In another example, the dragging of the marker 716 may be restricted by the periphery of the 3D virtual object and the user may then have to rotate the 3D virtual object before continuing with the dragging of the marker 716. In another embodiment, the 3D virtual object and the marker 716 may be rotated and dragged, respectively, based on a voice command of the user. Based on the view-angle change user input, the out-focal view 704 changes to out-focal view 710. At the same instant of time, a corresponding change occurs in the in-focal view 702 and the in-focal view 702 changes to the in-focal view 708. Thus, the in-focal view and the out-focal view change in synchronization with each other based on changes in the out-focal view.

FIGS. 8A, 8B, 8C, and 8D illustrate graphical user interfaces (GUIs) 800 for setting/changing a plurality of configuration settings of a 3D virtual object 802 on which an out-focal view is being rendered according to various embodiments of the disclosure.

Figure 8A:
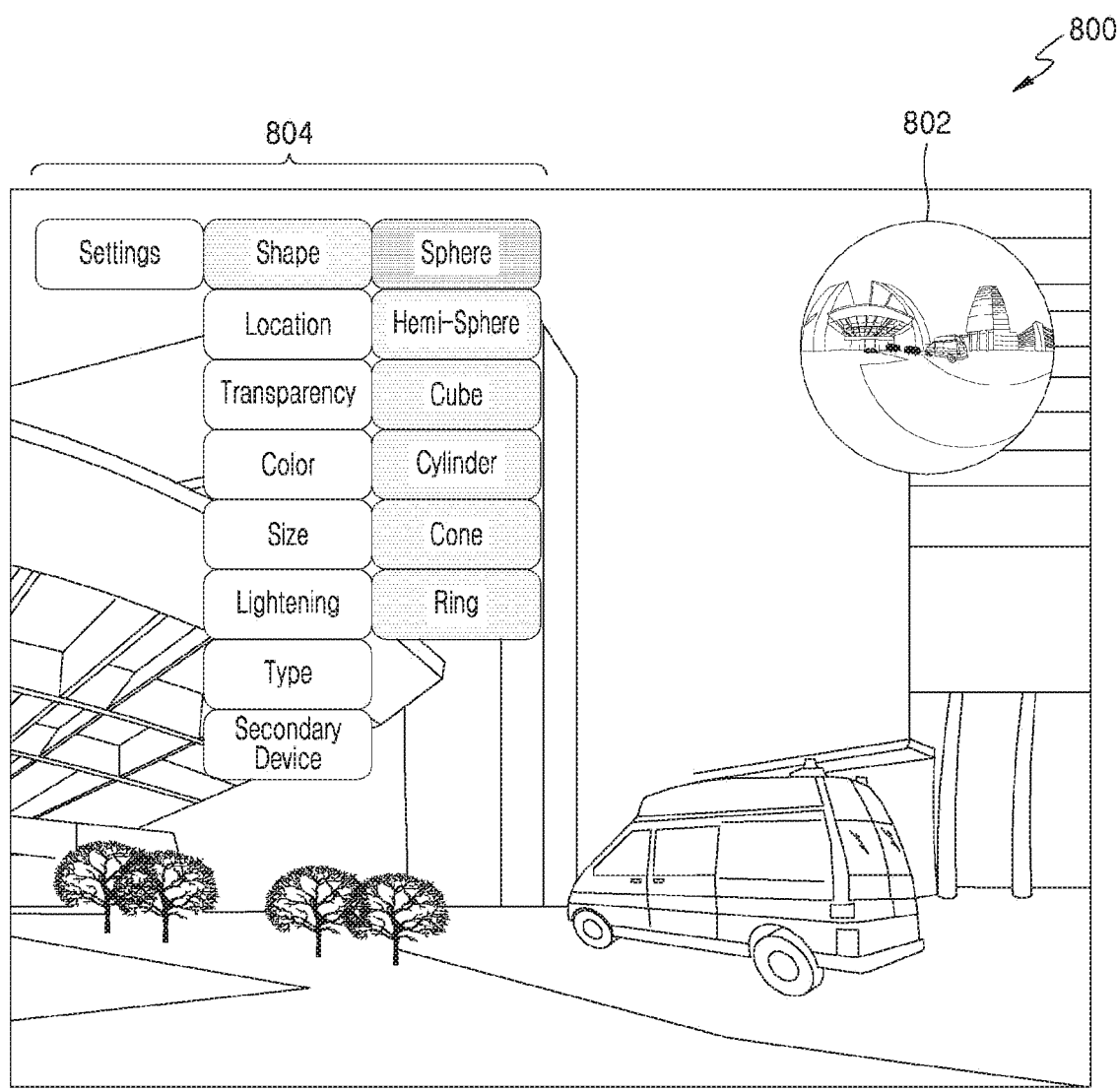
Figure 8B:
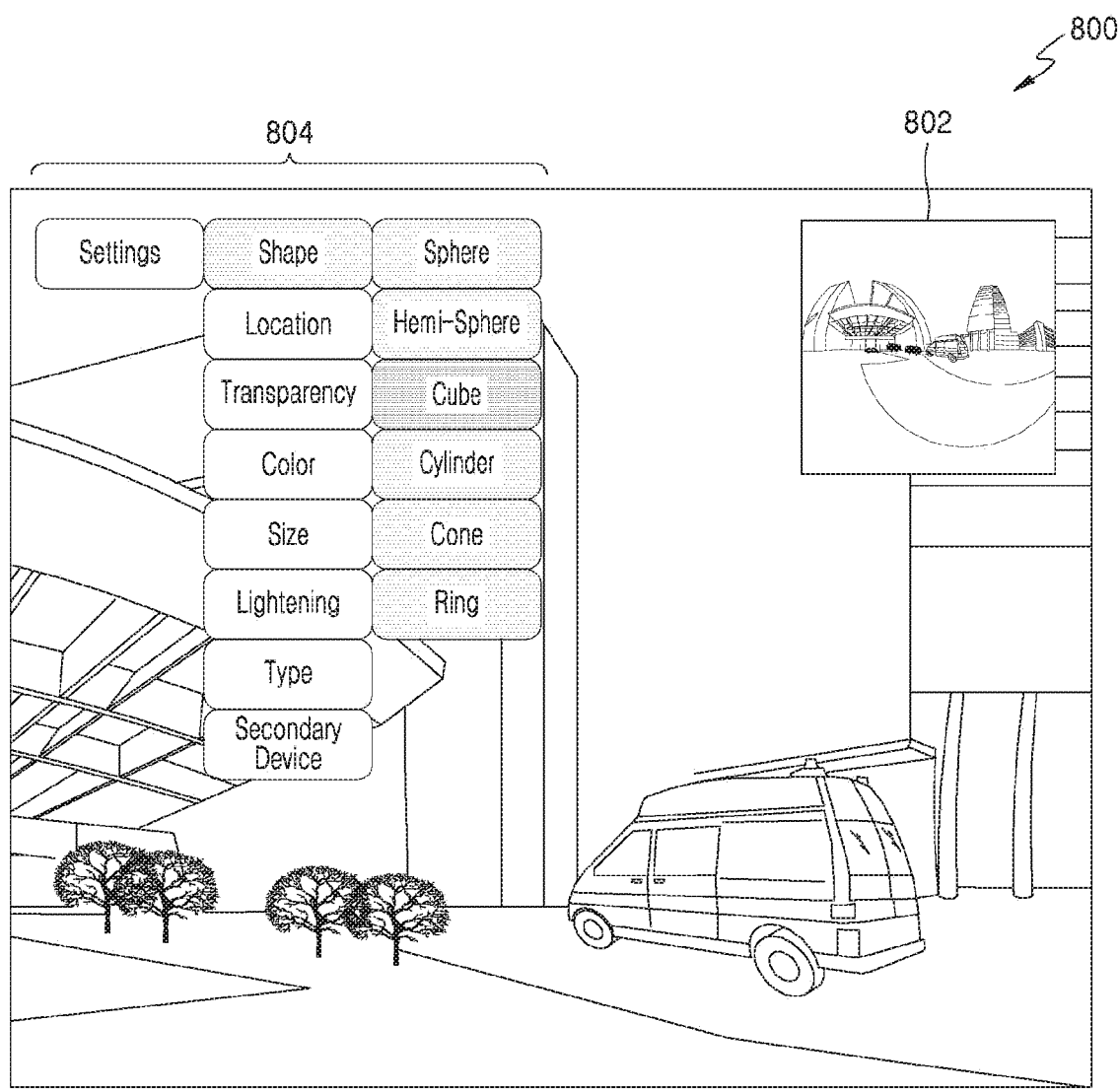
Figure 8C:
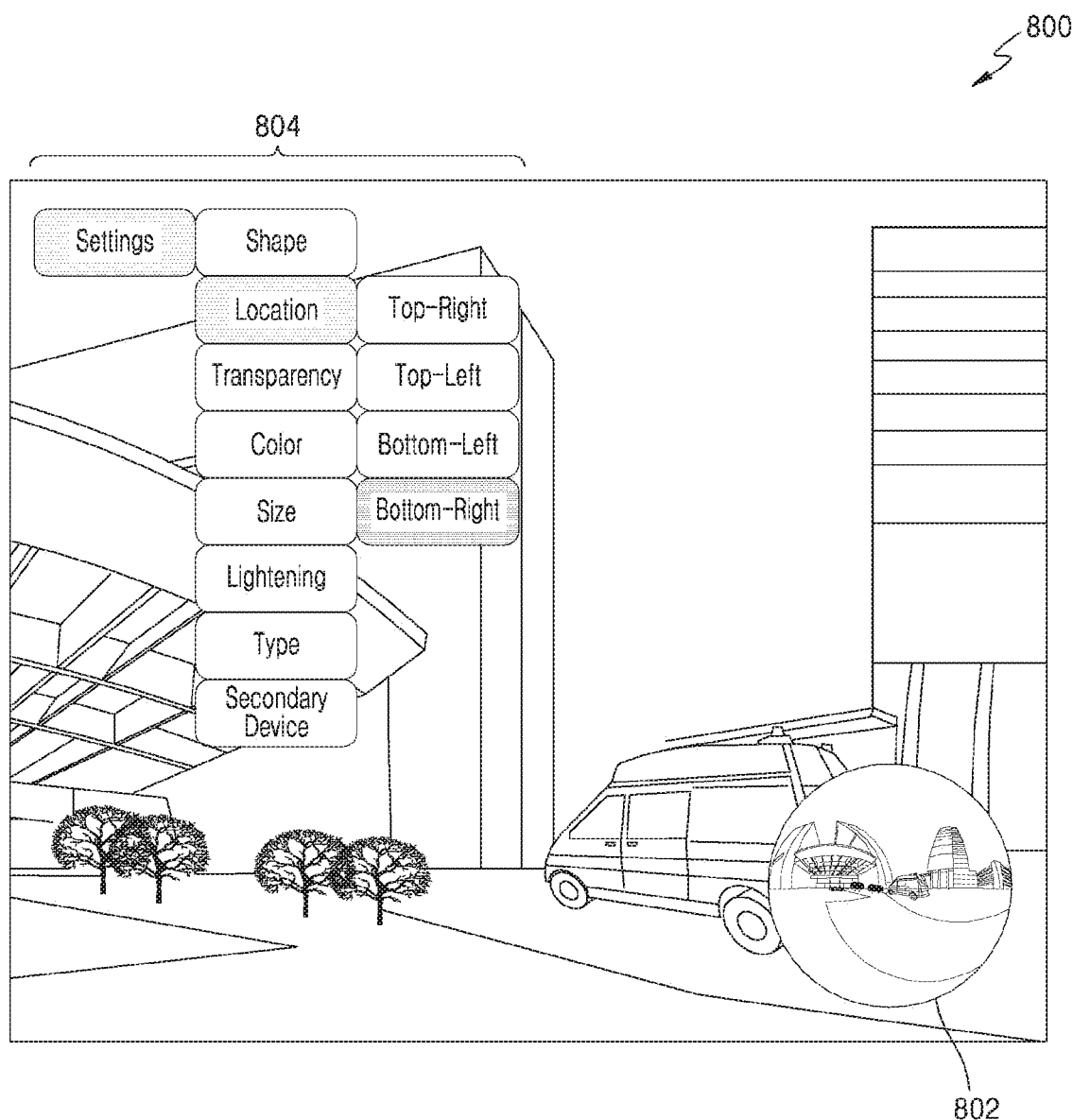

Referring to FIG. 8A, the GUI 800 provides the user with a plurality of menu options 804 (individually referred to as option 804) for changing the configuration settings of the 3D virtual object 802 on a display. For instance, the user may select to change the shape of the 3D virtual object 802 from spherical to cuboidal based on an option 804. Accordingly, the shape of the 3D virtual object 802 changes from spherical to cuboidal, as illustrated in the FIG. 8B. Similarly, using another option 804, the user may choose to change a position of the 3D virtual object 802. For instance, as shown in the FIG. 8C, the user may select an option 804 for placing the 3D virtual object 802 at a bottom right position of the GUI 800. In another embodiment, the user may choose an option 804 for rendering the out-focal view on a second display, such as a laptop, a tablet, or a mobile phone 810, as illustrated in FIG. 8D. After a selection of the option, the 3D virtual object 802 may be or may not be removed from the GUI 800 and is rendered on the selected second device. In a similar way, the user may change a transparency level, a color, a size, a type of the out-focal view, a device to be connected for remotely displaying the out-focal view and other configuration settings of the 3D virtual object 802.

Figure 9:
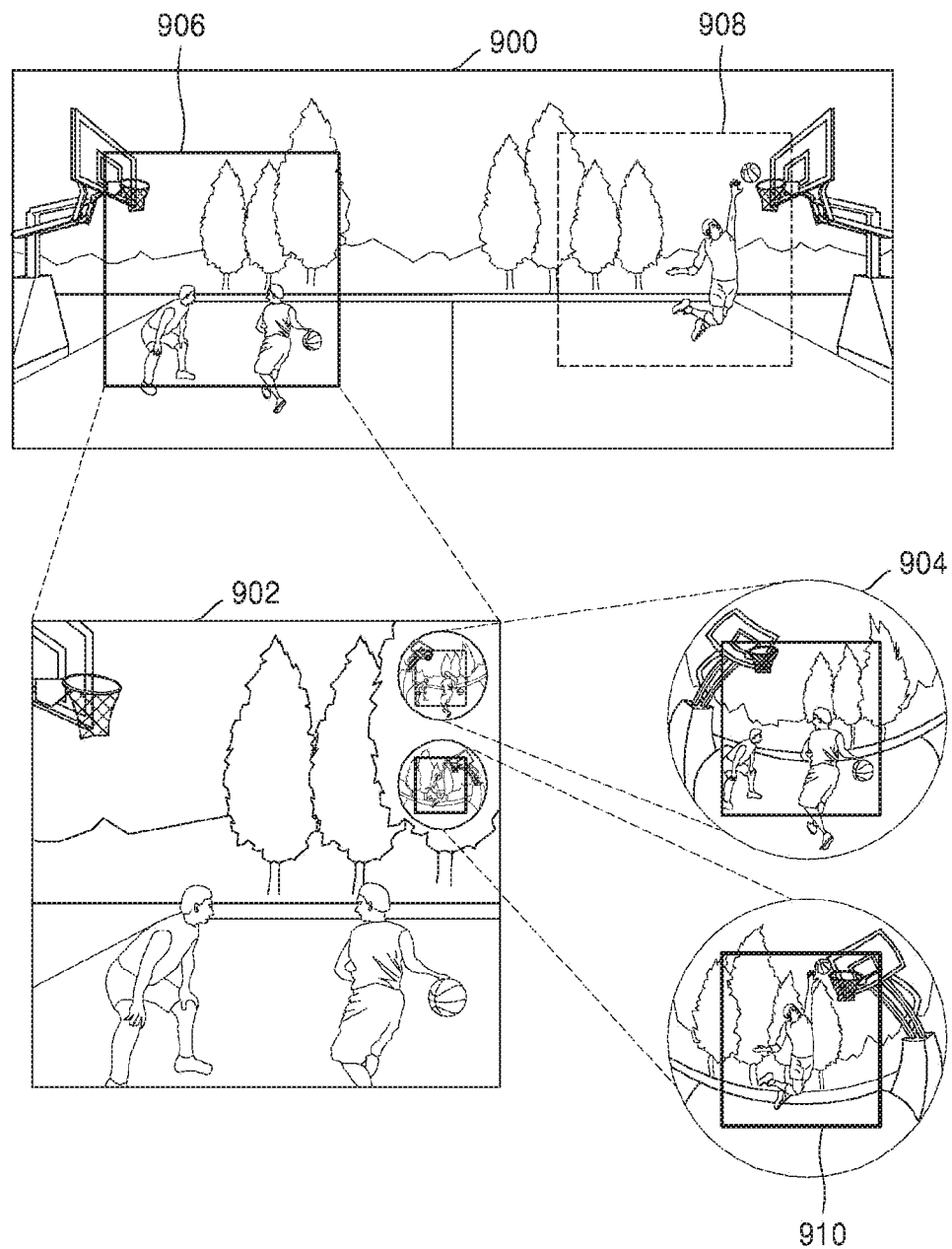
FIG. 9 illustrates a use case where a notification related to an event being missed is provided to a user, according to an embodiment of the disclosure.

FIG. 9 illustrates a case where a notification related to an event being missed is provided to a user according to an embodiment of the disclosure.

With reference to FIG. 9, when the user is watching a wide view video of a sporting event, for example, a basketball game, it is possible that in a view other than a current view of the user, a goal is about to be scored. Since, the user's current view is not focussing on the view where the goal is about to be scored, the user may miss out on the goal scene. According to an embodiment of the disclosure, the user may be provided with a notification related to events such as a goal scored which is missed in other views of the wide view digital content.

Referring to FIG. 9, a frame 900 of a wide view video of a sporting event is shown. According to an embodiment, an in-focal view 902 and out-focal view 904, generated based on the frame 900, is displayed to the user. As is shown, the user may have his focus on a portion 906 of the frame 900, whereas an interesting event is occurring in a portion 908. In such a case, an event notification 910 may be rendered to the user on the out-focal view 904. The event notification 910 may be rendered by displaying a part of the portion 908 on the out-focal view. Further, a color of a marker highlighting the event being missed may also be changed to depict the interesting event being missed. Thus, the user is notified of the event being missed. According to an embodiment, the user may select the marker and, both of the in-focal view and the out-focal view may change accordingly to show the interesting event to the user. That is, the action event occurring in the portion 908 becomes the current view of the user.

Figure 10:
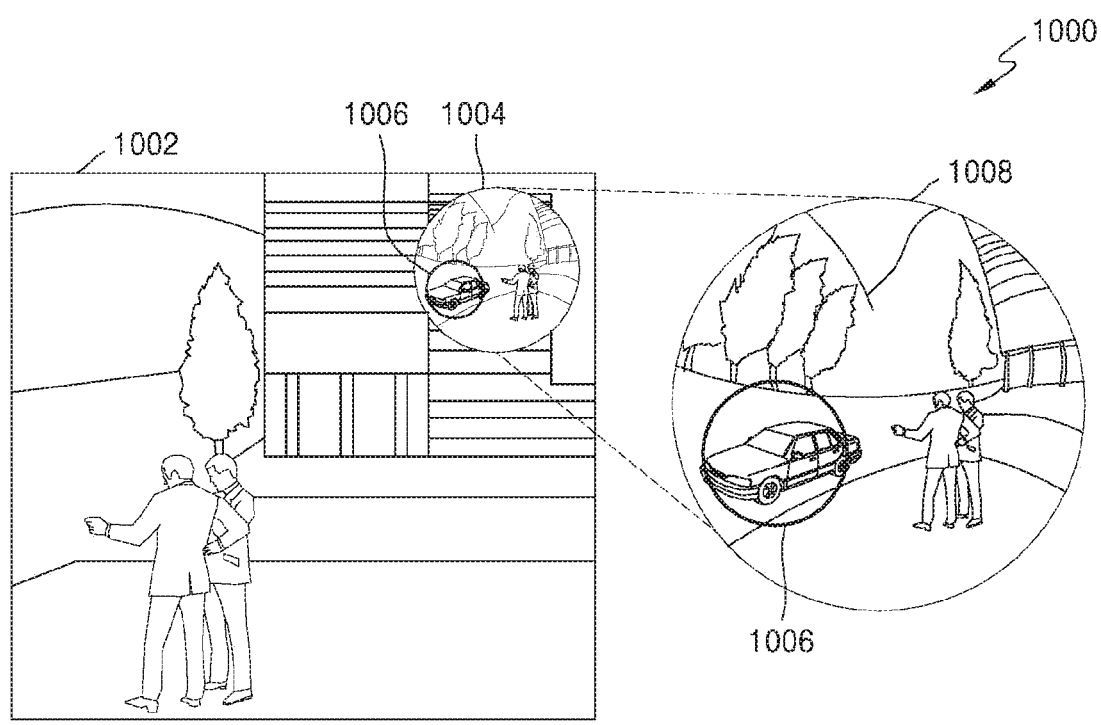
FIG. 10 illustrates a case where a most viewed portion of wide view digital content is presented to the user on the out-focal view, according to an embodiment of the disclosure.

FIG. 10 illustrates a use case where a most viewed portion of wide view digital content is presented to the user on the out-focal view according to an embodiment of the disclosure.

Referring to FIG. 10, where the user is watching a wide view photo of a car exhibition and a current view of the user corresponds to a portion other than the most viewed portion of the wide view digital content, such as the car. For instance, as shown in the FIG. 10, the user may be viewing a view 1000. The view 1000 includes an in-focal view 1002, which is a current view of the user. The view further includes an out-focal view 1004. As shown in FIG. 10, the user's current view, i.e., the view 1000, is focussed away from the car. In such a case, the most viewed portion may be provided to the user on the out-focal view 1004. According to an embodiment, the most viewed portion may be provided as a heat map on the out-focal view 1004. For example, the out-focal view 1004 includes a heat map 1006 highlighting the most viewed portion of the wide view digital content. In another embodiment, any other form of marking may be used for highlighting the most viewed portion of the wide view digital content. An expanded view 1008 of the out-focal view 1004 is also shown in the FIG. 10. When presented with the most viewed portion, the user may choose to view the most viewed portion. Accordingly, the user may provide a view-angle change user input on the out-focal view 1004 for selecting the most viewed portion. Based on the view-angle change user input, the in-focal view 1002 gets updated and the most viewed portion is rendered on the in-focal view 1002.

Figure 11A:
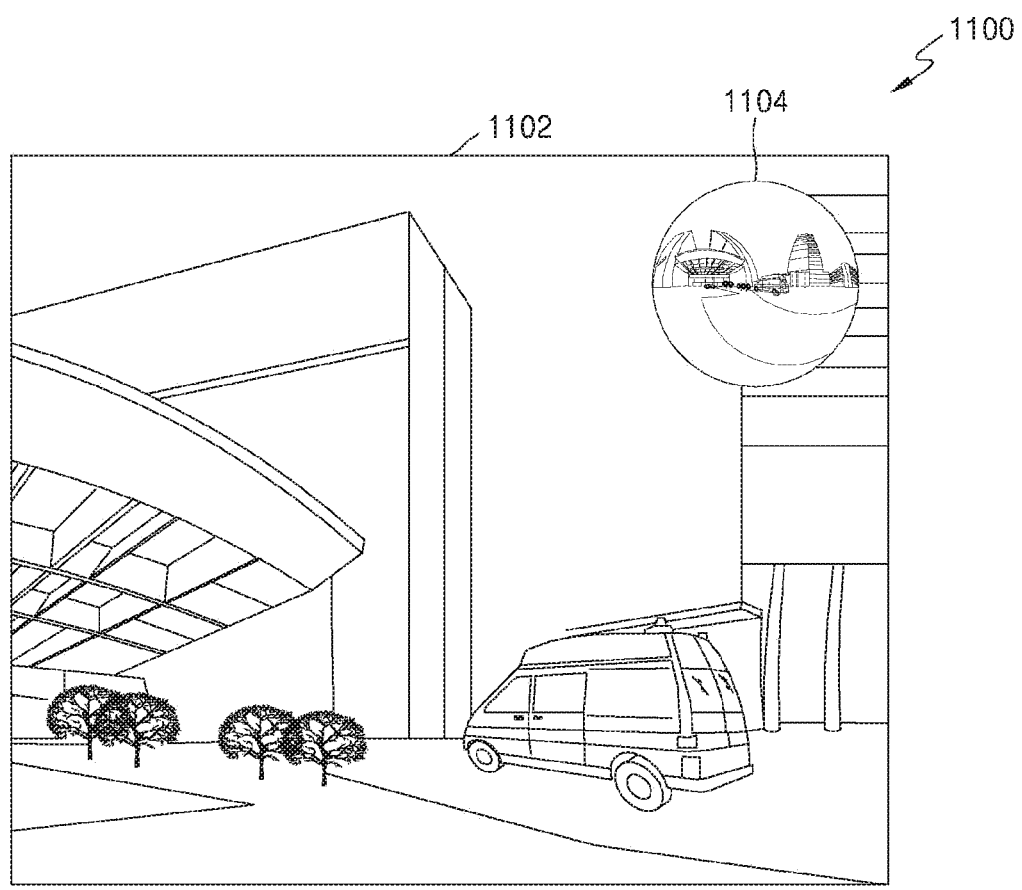
FIGS. 11A and 11B illustrate cases where the user may interchange the in-focal view and the out-focal view, according to various embodiments of the disclosure.
Figure 11B:
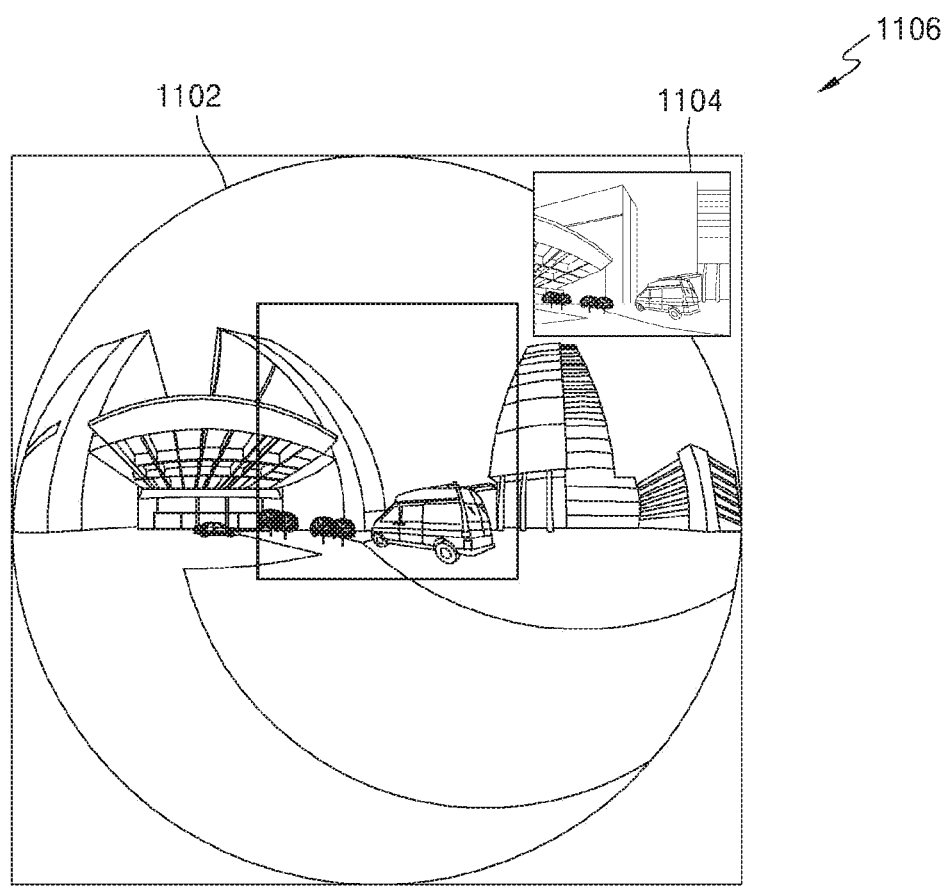

FIGS. 11A and 11B illustrate example embodiments where the user may interchange the in-focal view and the out-focal view according to various embodiments of the disclosure.

Referring to FIG. 11A, a view 1100 is generated based on wide view digital content. The view 1100 includes an in-focal view 1102 and an out-focal view 1104. In an example, the user may seek to switch the in-focal view 1102 with the out-focal view 1104 as shown in FIG. 11B. That is to say, the user may wish to view the out-focal view 1104 in an area where the in-focal view 1102 is being currently displayed, and vice versa. In the embodiment, the user may provide a view-switch user input for switching the in-focal view 1102 and the out-focal view 1104. Based on the view-switch user input, the in-focal view 1102 and the out-focal view 1104 are switched each other. In the view 1106, the out-focal view 1104 is now displayed in an area where the in-focal view 1102 was previously displayed. Likewise, the in-focal view 1102 now gets displayed in an area where the out-focal view 1104 was previously displayed.

Figure 12A:
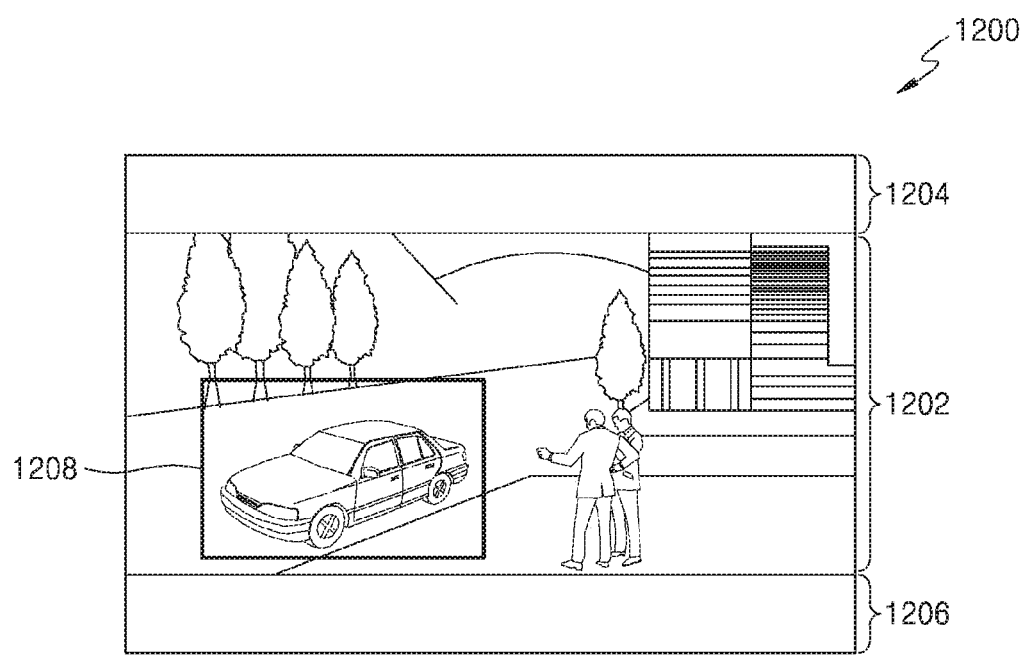
FIGS. 12A, 12B, and 12C illustrate a generation of an out-focal view based on digital content, according to various embodiments of the disclosure.
Figure 12B:
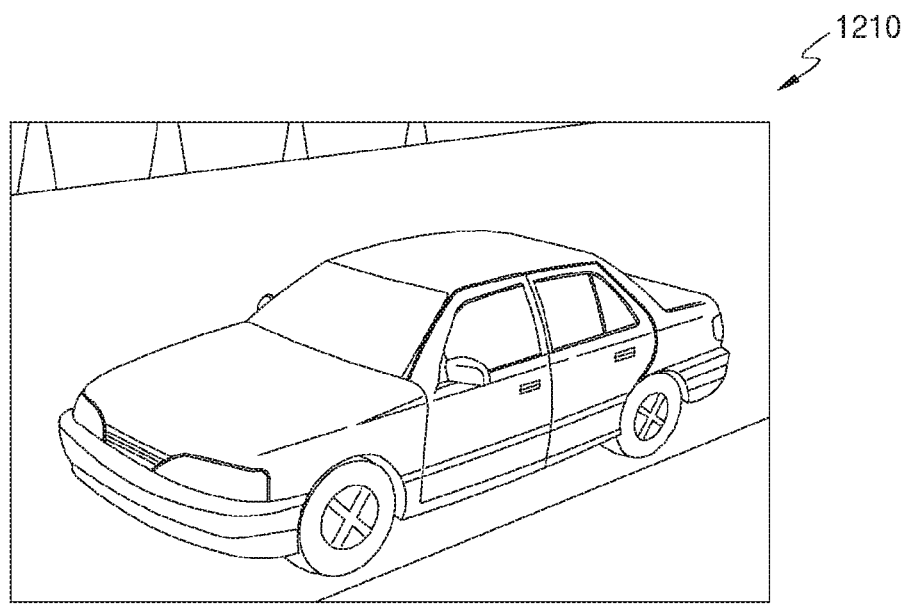
Figure 12C:
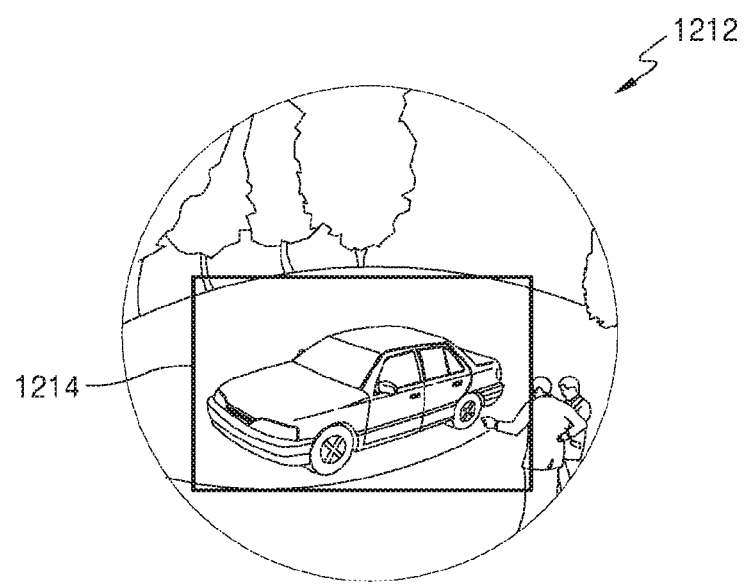

FIGS. 12A, 12B, and 12C illustrate a generation of an out-focal view based on digital content according to various embodiments of the disclosure.

In certain cases, only a part of the digital content is recorded in wide view mode. For instance, referring to FIG. 12A, in a frame 1200, only a portion 1202 is recorded in wide view mode. The frame 1200 further includes a top portion 1204 and a bottom portion 1206. The top portion 1204 and the bottom portion 1206 are not recorded in the current example. According to an embodiment, a user may seek to view a portion 1208 of the frame 1200. Accordingly, referring to FIG. 12B, an in-focal view 1210 is generated based on the portion 1208. Further, referring to FIG. 12C, an out-focal view 1212 is also generated based on the portion 1208 and an adjoining portion. The adjoining portion may include portion only from the portion 1202 as only the portion 1202 is in wide view mode. The out-focal view 1212 includes a perspective representation 1214 of the portion 1208 and includes the adjoining portion from the portion 1202. Thus, the out-focal view 1212 is generated based on the available wide view digital content.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of managing wide view content in a virtual reality (VR) device, the method comprising:
    receiving content covering a wider viewing angle than a viewing angle of a user of the VR device; and
    displaying, on the VR device,
        a first view displaying at least one portion of the content covering the viewing angle of the user on a first view area of a display of the VR device, and
        a second view covering the wider viewing angle of the content using convex projection on a second view area of the display, the wider viewing angle including the viewing angle of the user.

2. The method of claim 1, wherein the content comprises content with coverage of 360 degree viewing angle.

3. The method of claim 1,
    wherein the first view is provided from an in-focal view point within a VR sphere where the content is rendered on an inner surface of the VR sphere, and
    wherein the second view is provided from an out-focal view point outside the VR sphere on the display of the VR device where the content is rendered on an outer surface of the VR sphere.

4. The method of claim 3, further comprising:
    generating the first view based on angle information corresponding to the at least one portion of the content covering the viewing angle of the user on the first view area of the display of the VR device.

5. The method of claim 3, further comprising:
    generating the second view based on metadata associated with the content.

6. The method of claim 1, further comprising:
    connecting to a device via a network; and
    transmitting the second view to the device for displaying the second view covering the wider viewing angle of the content using convex projection on a display of the device.

7. The method of claim 1, further comprising:
    displaying a configuration setting menu on the first view area of the display of the VR device,
    wherein the configuration setting menu comprises at least one of shape, location, a degree of transparency, color, type of the second view, or a device to be connected for displaying the second view.

8. The method of claim 1, further comprising:
    interchanging the first view and the second view in terms of at least one of size, location, or shape of each of the first view and the second view on the display of the VR device.

9. The method of claim 8, wherein the interchanging of the first view and the second view comprises:
    synchronizing the first view and the second view; and
    interchanging, based on the synchronizing of the first view and the second view, the first view and the second view according to the user input of the user and the angle information.

10. The method of claim 1, further comprising:
    rotating the second view in response to a user input at a predetermined interval while the first view is halted.

11. The method of claim 10, further comprising:
    halting the rotation of the second view in response to a user input.

12. The method of claim 1, further comprising:
    extracting angle information of the content from the content covering the wider viewing angle than the viewing angle of the user of the VR device,
    wherein the displaying of the first view and the second view comprises displaying the first view and the second view based on the angle information.

13. The method of claim 12, further comprising:
    rotating the first view and the second view according to a user input of the user and the angle information.

14. The method of claim 12, wherein the user input comprises at least one of head movement, an eye movement, a text input or a gesture input of the user.

15. The method of claim 1, wherein the first view is displayed using at least one of concave projection or plain projection.

16. The method of claim 1, wherein the second view provides an out-focal view of an in-focal view of the first view.

17. The method of claim 1, wherein the second view comprises a marker indicative of the at least one portion of the content covered by the first view.

18. An apparatus for managing wide view content, the apparatus comprising:
    a communication circuit for receiving content covering a wider viewing angle than a viewing angle of a user of the apparatus; and
    a display for displaying:
        a first view displaying at least one portion of the content covering the viewing angle of the user on a first view area, and
        a second view covering the wider viewing angle of the content using convex projection on a second view area, the wider viewing angle including the viewing angle of the user.

19. The apparatus of claim 18, further comprising:
    at least one processor configured to generate the first view based on angle information corresponding to the at least one portion of the content covering the viewing angle of the user on the first view area of the display,
    wherein the first view is generated based on an in-focal view point within a VR sphere where the content is rendered on an inner surface of the VR sphere, and
    wherein the second view is generated based on an out-focal view point outside the VR sphere where the content is rendered on an outer surface of the VR sphere.

20. The apparatus of claim 18, wherein the communication circuit is further configured to:
    connect to a device via a network, and
    transmit the second view to the device for displaying the second view covering the wider viewing angle of the content using convex projection on a display of the device.

21. A non-transitory computer readable storage medium having a computer readable program stored therein, the computer readable program, when executed on a first device, configured to execute instructions to cause the first device to:
    receive content covering a wider viewing angle than a viewing angle of a user of the first device; and
    display, on the first device,
        a first view displaying at least one portion of the content covering the viewing angle of the user on a first view area of a display of the first device, and
        a second view covering the wider viewing angle of the content using convex projection on a second view area of the display, the wider viewing angle including the viewing angle of the user.

\* \* \* \* \*